United States Patent
Saneto et al.

(10) Patent No.: US 11,906,865 B2
(45) Date of Patent: Feb. 20, 2024

(54) REFLECTIVE SHEET AND TRANSFER FILM FOR REFLECTIVE SHEET

(71) Applicant: FUJIFILM Corporation, Tokyo (JP)

(72) Inventors: Ryuji Saneto, Minamiashigara (JP); Akira Yamamoto, Minamiashigara (JP); Hideki Kaneiwa, Minamiashigara (JP); Makoto Ishiguro, Minamiashigara (JP); Michio Nagai, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 186 days.

(21) Appl. No.: 17/487,490

(22) Filed: Sep. 28, 2021

(65) Prior Publication Data
US 2022/0011618 A1    Jan. 13, 2022

Related U.S. Application Data

(63) Continuation of application No. PCT/JP2020/013407, filed on Mar. 25, 2020.

(30) Foreign Application Priority Data

Mar. 29, 2019   (JP) .................. 2019-068124

(51) Int. Cl.
G02F 1/137   (2006.01)
B32B 7/023   (2019.01)
G02B 5/08   (2006.01)

(52) U.S. Cl.
CPC .......... *G02F 1/13718* (2013.01); *B32B 7/023* (2019.01); *G02B 5/08* (2013.01)

(58) Field of Classification Search
CPC ........ G02F 1/13718; B32B 7/023; G02B 5/08
See application file for complete search history.

(56) References Cited

U.S. PATENT DOCUMENTS

| 2002/0019454 A1* | 2/2002 | Kanai ................. C08K 5/5397 522/64 |
| 2002/0058147 A1* | 5/2002 | Taruishi ................. C03C 17/30 428/447 |

(Continued)

FOREIGN PATENT DOCUMENTS

| JP | 2000-347017 A | 12/2000 |
| JP | 2004-133152 A1 | 4/2004 |

(Continued)

OTHER PUBLICATIONS

Japanese Notice of Reasons for Refusal for corresponding Japanese Application No. 2021-511878, dated Sep. 27, 2022, with an English translation.

(Continued)

*Primary Examiner* — Lucy P Chien
(74) *Attorney, Agent, or Firm* — Birch, Stewart, Kolasch & Birch, LLP

(57) ABSTRACT

Provided are a reflective sheet including a cholesteric liquid crystal layer and having excellent reflection wavelength range, diffuse reflectivity, reflectivity, hardness, and scratch resistance; and a transfer film for a reflective sheet that is used for the reflective sheet. The reflective sheet includes a substrate, an adhesive layer, a cholesteric liquid crystal layer, and a hard coat layer in this order, in which in a cross-section of the cholesteric liquid crystal layer observed, at least a part of bright portions and dark portions has a flapping structure, the cholesteric liquid crystal layer has a pitch gradient structure in which a helical pitch changes in a thickness direction, and the helical pitch on the adhesive layer side is larger than that on the hard coat layer side.

14 Claims, 5 Drawing Sheets

(56) References Cited

U.S. PATENT DOCUMENTS

| | | | |
|---|---|---|---|
| 2006/0008649 A1 | 1/2006 | Shinichird | |
| 2014/0160540 A1* | 6/2014 | Hoshino | G02B 5/3016 |
| | | | 359/2 |
| 2017/0299785 A1* | 10/2017 | Saitoh | G02F 1/133536 |
| 2018/0237695 A1 | 8/2018 | Kusano | |
| 2019/0391479 A1 | 12/2019 | Katoh et al. | |
| 2020/0225387 A1* | 7/2020 | Ishiguro | C08F 20/30 |

FOREIGN PATENT DOCUMENTS

| | | |
|---|---|---|
| JP | 2010-111104 A | 5/2010 |
| JP | 2018-180122 A | 11/2018 |
| WO | WO 2012/137550 A1 | 10/2012 |
| WO | WO 2017/018468 A1 | 2/2017 |
| WO | WO 2018/159751 A1 | 9/2018 |

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2020/013407, dated Oct. 14, 2021.
International Search Report (Form PCT/ISA/210) for International Application No. PCT/JP2020/013407. dated Jun. 16, 2020, with English translation.
Japanese Decision of Refusal for corresponding Japanese Application No. 2021-511878, dated Jan. 31, 2023, with English translation.

* cited by examiner

REFLECTIVE SHEET AND TRANSFER FILM FOR REFLECTIVE SHEET

CROSS-REFERENCE TO RELATED APPLICATIONS

This application is a Continuation of PCT International Application No. PCT/JP2020/013407 filed on Mar. 25, 2020, which claims priority under 35 U.S.C. § 119(a) to Japanese Patent Application No. 2019-068124 filed on Mar. 29, 2019. The above application is hereby expressly incorporated by reference, in its entirety, into the present application.

BACKGROUND OF THE INVENTION

1. Field of the Invention

The present invention relates to a reflective sheet used for a decorative sheet or the like and a transfer film for a reflective sheet that is used for the reflective sheet.

2. Description of the Related Art

A cholesteric liquid crystal layer obtained by immobilizing a cholesteric liquid crystalline phase is known as a layer having properties in which at least either right circularly polarized light or left circularly polarized light in a specific wavelength range is selectively reflected. Therefore, the cholesteric liquid crystal layer is used in various applications, and, for example, the use as a reflective sheet such as a decorative sheet is considered.

For example, JP2010-111104A describes a decorative sheet in which two cholesteric liquid crystal layers having different turning directions of circularly polarized light to be reflected are laminated.

In addition, JP2010-111104A describes that more satisfactory metallic gloss can be obtained by providing a pitch gradient structure (helical structure) where a helical pitch changes in a thickness direction in the cholesteric liquid crystal layers. The wavelength range where the cholesteric liquid crystal layer selectively reflects light correlates to the length of a helical pitch of a helical structure in the cholesteric liquid crystal layer. Accordingly, in the cholesteric liquid crystal layer in which the helical pitch changes in the thickness direction, the selective reflection wavelength range is widened, and higher metallic gloss can be obtained.

In addition, it is preferable that the reflective sheet has diffuse reflectivity. However, reflection of light from the cholesteric liquid crystal layer is so-called specular reflection. For example, light incident from the normal direction is reflected in the normal direction.

On the other hand, JP2018-180122A describes that bright portions and dark portions derived from a cholesteric liquid crystalline phase in a cholesteric liquid crystal layer have a flapping structure (wave-like structure) such that satisfactory diffuse reflectivity can be obtained.

In a case where a cross-section of the cholesteric liquid crystal layer is observed with a scanning electron microscope, a stripe pattern including bright portions and dark portions derived from the cholesteric liquid crystalline phase is observed. In a typical cholesteric liquid crystal layer that reflects light by specular reflection, this stripe pattern including bright portions and dark portions is linear in a plane direction. In this typical cholesteric liquid crystal layer, a helical axis of a liquid crystal compound is directed to one direction. Therefore, light incident into the cholesteric liquid crystal layer is specularly reflected.

On the other hand, as disclosed in JP2018-180122A, in the cholesteric liquid crystal layer where the stripe pattern including bright portions and dark portions has a flapping structure, the helical axis of the liquid crystal compound is directed to various directions. Therefore, in the cholesteric liquid crystal layer having the flapping structure, incidence light is diffused and reflected in a direction of a helical axis without being reflected by specular reflection.

SUMMARY OF THE INVENTION

For the reflective sheet including the cholesteric liquid crystal layer, various performances such as high diffuse reflectivity, wide reflection wavelength range, high reflectivity, sufficient hardness, and excellent surface scratch resistance are required depending on uses.

The cholesteric liquid crystal layer has a pitch gradient structure in which a helical pitch changes in a thickness direction such that the reflection wavelength range can be widened. In addition, the bright portions and the dark portions in the cholesteric liquid crystal layer have the flapping structure such that satisfactory diffuse reflectivity can be obtained. Accordingly, by using the cholesteric liquid crystal layer the bright portions and the dark portions have the flapping structure and the helical pitch changes in the thickness direction, a reflective sheet that can reflect light having a wide wavelength range with satisfactory diffusibility.

However, a reflective sheet including a cholesteric liquid crystal layer and having a wide reflection wavelength range, satisfactory diffuse reflectivity, high reflectivity, sufficient hardness, and excellent surface scratch resistance has yet to be realized.

An object of the present invention is to solve the above-described problem of the related art and to provide: a reflective sheet including a cholesteric liquid crystal layer and having a wide reflection wavelength range, satisfactory diffuse reflectivity, high reflectivity, sufficient hardness, and excellent surface scratch resistance; and a transfer film for a reflective sheet that is used for the reflective sheet.

In order to achieve the object, the present invention has the following configurations.

[1] A reflective sheet comprising, in the following order:
a substrate;
an adhesive layer;
a cholesteric liquid crystal layer obtained by immobilizing a cholesteric liquid crystalline phase; and
a hard coat layer,
in which in a cross-section of the cholesteric liquid crystal layer observed with a scanning electron microscope, at least a part of bright portions and dark portions derived from the cholesteric liquid crystalline phase has a flapping structure, and
the cholesteric liquid crystal layer has a pitch gradient structure in which a helical pitch changes in a thickness direction, and
the helical pitch on the adhesive layer side is larger than that on the hard coat layer side.

[2] The reflective sheet according to [1],
in which as the cholesteric liquid crystal layer, a first cholesteric liquid crystal layer and a second cholesteric liquid crystal layer where a selective reflection center wavelength is the same as that of the first cholesteric liquid crystal layer and a turning direction of circularly polarized light to be selectively reflected is opposite to that of the first cholesteric liquid crystal layer are provided.

[3] The reflective sheet according to [1] or [2],
in which in a case where light is emitted from the hard coat layer side, an integral reflectivity with respect to light having a wavelength of 450 nm is 50% to 90% and an integral reflectivity with respect to light having a wavelength of 500 nm is 30% to 80%.

[4] The reflective sheet according to any one of [1] to [3], in which a thickness of the adhesive layer is 30 µm or less.

[5] The reflective sheet according to any one of [1] to [4], in which the adhesive layer is a layer obtained by curing an ultraviolet curable adhesive.

[6] The reflective sheet according to any one of [1] to [5], in which the hard coat layer and the cholesteric liquid crystal layer are directly laminated.

[7] The reflective sheet according to any one of [1] to [6], in which the hard coat layer is a layer including a polymer obtained by polymerization of a monomer having three or more polymerizable groups.

[8] The reflective sheet according to any one of [1] to [7], in which a thickness of the hard coat layer is 1 µm or more.

[9] A transfer film for a reflective sheet comprising, in the following order:
a peelable support;
a hard coat layer; and
a cholesteric liquid crystal layer obtained by immobilizing a cholesteric liquid crystalline phase,
in which in a cross-section of the cholesteric liquid crystal layer observed with a scanning electron microscope, at least a part of bright portions and dark portions derived from the cholesteric liquid crystalline phase has a flapping structure, and
the cholesteric liquid crystal layer has a pitch gradient structure in which a helical pitch changes in a thickness direction, and
the helical pitch on a side opposite to the hard coat layer is larger than that on the hard coat layer side.

[10] The transfer film for a reflective sheet according to [9],
in which as the cholesteric liquid crystal layer, a first cholesteric liquid crystal layer and a second cholesteric liquid crystal layer where a selective reflection center wavelength is the same as that of the first cholesteric liquid crystal layer and a turning direction of circularly polarized light to be selectively reflected is opposite to that of the first cholesteric liquid crystal layer are provided.

[11] The transfer film for a reflective sheet according to [9] or [10],
in which the hard coat layer and the cholesteric liquid crystal layer are directly laminated.

[12] The transfer film for a reflective sheet according to any one of [9] to [11],
in which the hard coat layer is a layer including a polymer obtained by polymerization of a monomer having three or more polymerizable groups.

[13] The transfer film for a reflective sheet according to any one of [9] to [12],
in which a thickness of the hard coat layer is 1 µm or more.

According to the present invention, it is possible to provide: a reflective sheet including a cholesteric liquid crystal layer and having a wide reflection wavelength range, satisfactory diffuse reflectivity, high reflectivity, sufficient hardness, and excellent surface scratch resistance; and a transfer film for a reflective sheet that is used for the reflective sheet.

DESCRIPTION OF THE PREFERRED EMBODIMENTS

Figure 1:
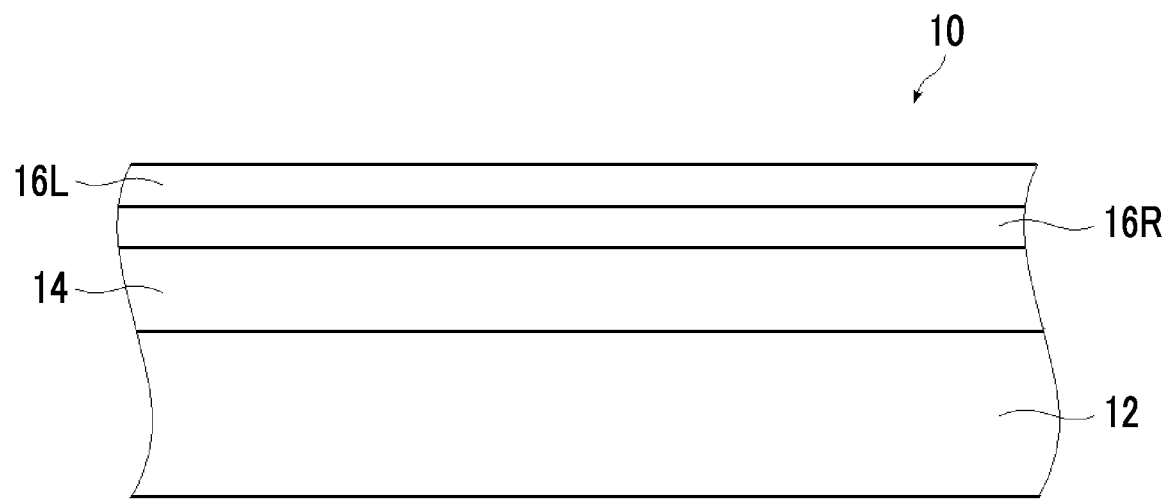
FIG. 1 is a diagram conceptually showing an example of a transfer film for a reflective sheet according to the present invention.

Hereinafter, the details of the present invention will be described.
The following description regarding components has been made based on a representative embodiment of the present invention. However, the present invention is not limited to the embodiment.
In the present invention, numerical ranges represented by "to" include numerical values before and after "to" as lower limit values and upper limit values.
In the present invention, "(meth)acrylate" represents "acrylate or methacrylate".
In addition, in the present invention, a liquid crystal composition and a liquid crystal compound include those that exhibit liquid crystal properties by curing or the like.
In the present invention a selective reflection center wavelength of the cholesteric liquid crystal layer and a half-width in a selective reflection wavelength range may be measured using the following method.
In a case where the integral reflectivity of the transfer film for a reflective sheet (reflective sheet) is measured, a spectrum waveform of the integral reflectivity having a peak shape (upward protrusion shape) in which the horizontal axis represents a wavelength is obtained. In this case, an average reflectivity (arithmetic mean) of a maximum value and a minimum value of the integral reflectivity is obtained. Among two wavelengths at two intersections between the waveform and the average reflectivity, in a case where a value of a wavelength on a short wavelength side is represented by $\lambda\alpha$ (nm) and a value of a wavelength on a long wavelength side is represented by $\lambda\beta$ (nm), the selective reflection wavelength is calculated from the following expression.

Selective Reflection Center Wavelength=$(\lambda\alpha+\lambda\beta)/2$

Half-Width=$(\lambda\beta-\lambda\alpha)$

In another method, by measuring a transmission spectrum of a sample using Axoscan manufactured by Axometrix Inc, the selective reflection center wavelength and the half-width can also be measured. By measuring the transmission spectrum, a transmission spectrum waveform having a valley shape (downward protrusion shape) in which the horizontal axis represents a wavelength is obtained. In this case, an average reflectivity (arithmetic mean) of a maximum value and a minimum value of the transmittance is obtained. Among two wavelengths at two intersections between the waveform and the average transmittance, in a case where a value of a wavelength on a short wavelength side is represented by λα (nm) and a value of a wavelength on a long wavelength side is represented by λβ (nm), the selective reflection center wavelength and the half-width are calculated from the above-described expressions.

For example, using a device in which a large integrating sphere device (ILV-471, manufactured by JASCO Corporation) is attached to a spectrophotometer (V-550, manufactured by JASCO Corporation) such that light was incident from the hard coat layer side of the reflective sheet, the integral reflectivity is measured without using optical trap.

In the present invention, selective reflection center wavelengths of a plurality of cholesteric liquid crystal layers being "equal" does not represent that the selective reflection center wavelengths are exactly equal, and error is allowed in a range where there are no optical effects.

Specifically, selective reflection center wavelengths of a plurality of cholesteric liquid crystal layers being "equal" represents a difference between the selective reflection center wavelengths of the respective objects is 20 nm or less.

FIG. 1 conceptually shows an example of a transfer film for a reflective sheet according to an embodiment of the present invention. In addition, FIG. 2 conceptually shows an example of the reflective sheet according to the embodiment of the present invention.

Figure 2:
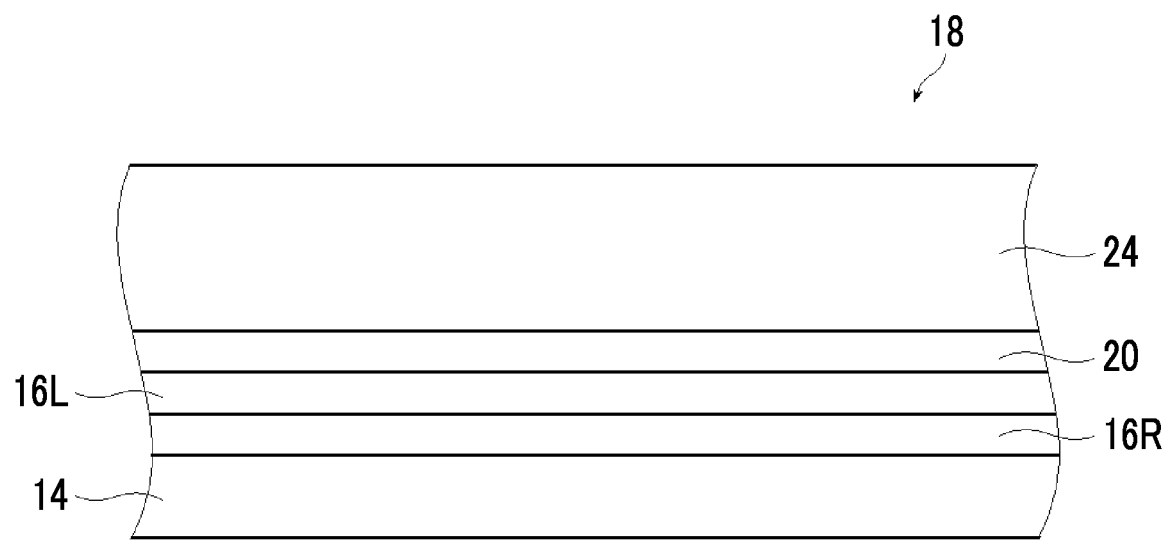
FIG. 2 is a diagram conceptually showing an example of a reflective sheet according to the present invention.

In order to describe the present invention, FIGS. 1 and 2 and other drawings conceptually show the transfer film for a reflective sheet according to the embodiment of the present invention or the like. Accordingly, the thickness or the like of each of the layers may be different from the actual one.

As shown in FIG. 1, the transfer film for a reflective sheet 10 includes a support 12, a hard coat layer 14, a first reflective layer 16R, and a second reflective layer 16L from the bottom in the drawing.

As shown in FIG. 2, a reflective sheet 18 includes the hard coat layer 14, the first reflective layer 16R, the second reflective layer 16L, an adhesive layer 20, and a substrate 24 from the bottom in the drawing.

Both the first reflective layer 16R and the second reflective layer 16L are cholesteric liquid crystal layers obtained by immobilizing a cholesteric liquid crystalline phase. The first reflective layer 16R and the second reflective layer 16L are cholesteric liquid crystal layers having the same selective reflection center wavelength. In addition, the first reflective layer 16R selectively reflects right circularly polarized light, and the second reflective layer 16L selectively reflects left circularly polarized light. Accordingly, the first reflective layer 16R corresponds to the first cholesteric liquid crystal layer according to the embodiment of the present invention. In addition, the second reflective layer 16L corresponds to the second cholesteric liquid crystal layer according to the embodiment of the present invention.

In the present invention, in a cross-section of each of the first reflective layer 16R and the second reflective layer 16L as the cholesteric liquid crystal layers observed with a scanning electron microscope (SEM), bright portions and dark portions derived from a cholesteric liquid crystalline phase have a flapping structure. Further, both the first reflective layer 16R and the second reflective layer 16L have a pitch gradient structure in which a helical pitch changes in a thickness direction, and the helical pitch on a side opposite to the hard coat layer 14 is larger than that on the hard coat layer 14 side. That is, in the reflective sheet 18, the helical pitch of each of the first reflective layer 16R and the second reflective layer 16L on the adhesive layer 20 side (substrate 24 side) is larger than that on the hard coat layer 14 side.

With the above-described configuration, the reflective sheet 18 according to the embodiment of the present invention exhibits a wide reflection wavelength range, satisfactory diffuse reflectivity, high reflectivity, sufficient hardness, and excellent surface scratch resistance as a reflective sheet including a cholesteric liquid crystal layer.

The above-described point will be described below.

The transfer film for a reflective sheet and the reflective sheet according to the embodiment of the present invention are not limited to including two cholesteric liquid crystal layers as in the example shown in the drawing.

That is, each of the transfer film for a reflective sheet and the reflective sheet according to the embodiment of the present invention may include only one cholesteric liquid crystal layer or may include three or more cholesteric liquid crystal layers.

In addition, in a case where each of the transfer film for a reflective sheet and the reflective sheet according to the embodiment of the present invention includes a plurality of cholesteric liquid crystal layers, all the layers may have different selective reflection center wavelengths, all the layers may have the same selective reflection center wavelength, or layers having different selective reflection center wavelengths and layers having the same selective reflection center wavelength may be mixed.

Further, in a case where each of the transfer film for a reflective sheet and the reflective sheet according to the embodiment of the present invention includes a plurality of cholesteric liquid crystal layers, turning directions of circularly polarized light to be selectively reflected in all the layers may be different from each other. Alternatively, in a case where each of the transfer film for a reflective sheet and the reflective sheet according to the embodiment of the present invention includes a plurality of cholesteric liquid crystal layers, turning directions of circularly polarized light to be selectively reflected in all the layers may be the same. Alternatively, in a case where each of the transfer film for a reflective sheet and the reflective sheet according to the embodiment of the present invention includes a plurality of cholesteric liquid crystal layers, layers where turning directions of circularly polarized light to be selectively reflected are different and layers where turning directions of circularly polarized light to be selectively reflected are the same may be mixed.

In particular, a configuration including two reflective layers (cholesteric liquid crystal layers) where selective reflection center wavelengths are the same and turning directions of circularly polarized light to be selectively reflected are opposite to each other is suitably used.

As a result, light in a wavelength range to be reflected can also reflect left circularly polarized light and right circularly polarized light, and a high reflectivity can be obtained.

Figure 3:
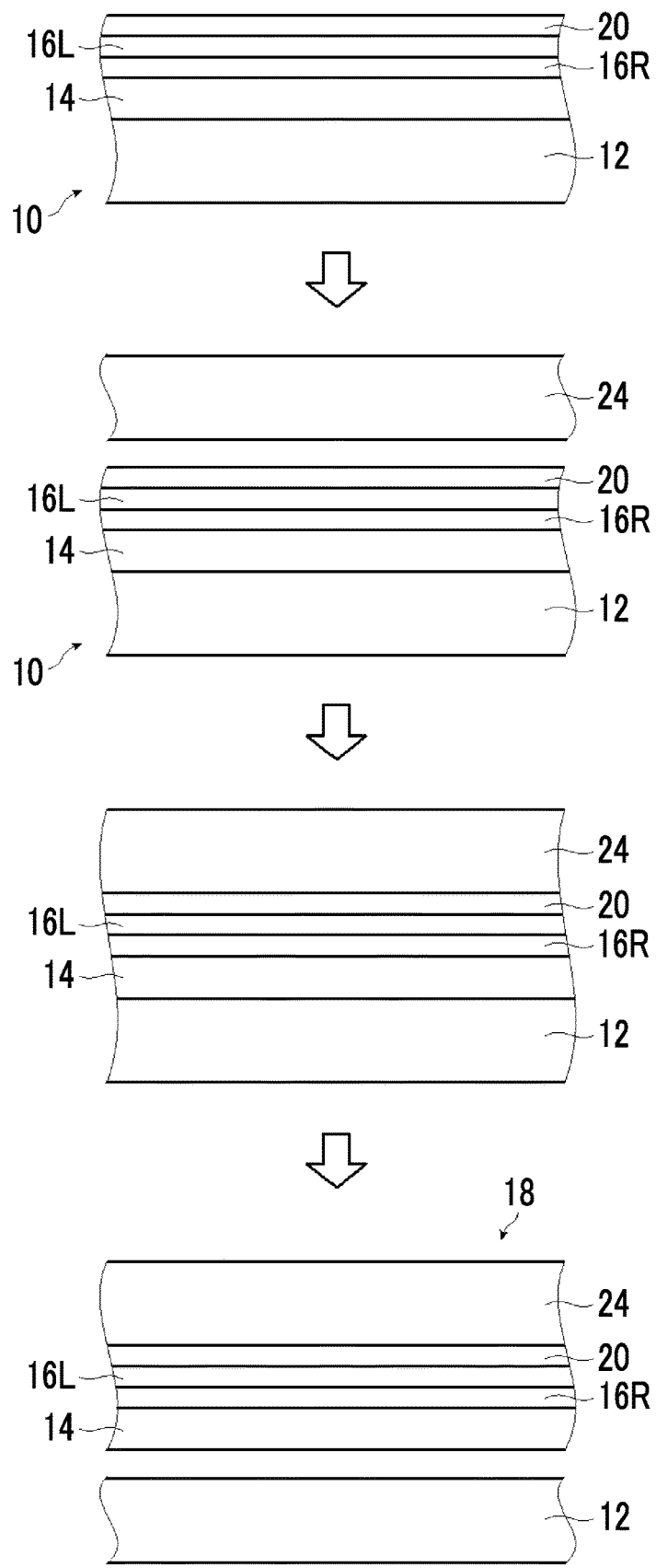
FIG. 3 is a diagram conceptually showing a relationship between the transfer film for a reflective sheet shown in FIG. 1 and the reflective sheet shown in FIG. 2.

The reflective sheet 18 shown in FIG. 2 is prepared using the transfer film for a reflective sheet 10 shown in FIG. 1. FIG. 3 shows a method of preparing the reflective sheet 18.

First, as shown in the upper section of FIG. 3, the adhesive layer 20 is formed on a surface of the second reflective layer 16L of the transfer film for a reflective sheet 10. Next, as shown in the second section and the third section from the top of FIG. 3, the substrate 24 is bonded to the adhesive layer

20. Finally, as shown in the fourth section from the top of FIG. 3, the support 12 is peeled off from the hard coat layer 14, and the reflective sheet 18 shown in FIG. 2 is obtained.

Hereinafter, the respective members forming the transfer film for a reflective sheet 10 and the reflective sheet 18 will be described.

<Support>

In the transfer film for a reflective sheet 10, the support 12 supports the hard coat layer 14, the first reflective layer 16R, and the second reflective layer 16L.

The support 12 is not particularly limited, and various well-known sheet-shaped materials (film or plate-shaped material) can be used. Examples of the support include a resin film formed of polyester such as polyethylene terephthalate (PET), polycarbonate (PC), an acrylic resin, an epoxy resin, a polyurethane, a cycloolefin resin, a polyamide, a polyolefin, a cellulose derivative, a resin film including a resin such as a cellulose derivative, a cycloolefin resin, or polyethylene terephthalate.

In the present invention, the support 12 is a peelable support. In a case where the reflective sheet 18 is prepared, the support 12 is peeled off from the hard coat layer 14 as shown in FIG. 3.

Examples of the peelable support 12 include a resin film including a resin such as a cellulose derivative, a cycloolefin resin, or polyethylene terephthalate. In particular, a resin film including polyethylene terephthalate is preferable.

In addition, the support 12 to which peelability is imparted by performing a well-known surface treatment on a surface of the non-peelable support 12 can also be used. Further, by using a resin film including an easy adhesion layer formed on one surface as the support 12 such that a surface thereof where the easy adhesion layer is not formed faces the hard coat layer 14 side, the resin film may be used as the peelable support 12.

The thickness of the support 12 is not particularly limited and may be appropriately adjusted to a value that can exhibit the action as the support of the hard coat layer 14, the first reflective layer 16R, and the second reflective layer 16L depending on the material for forming the support 12.

The thickness of the support 12 is preferably 35 μm or more, more preferably 50 μm or more, and still more preferably 80 μm or more. By adjusting the thickness of the support 12 to be 35 μm or more, the mechanical strength or the like of the transfer film for a reflective sheet 10 can be made suitable.

The upper limit of the thickness of the support 12 is not particularly limited, and from the viewpoint of preventing the transfer film for a reflective sheet 10 from being unnecessarily thick, is preferably 1000 μm or less, more preferably 500 μm or less, and still more preferably 300 μM or less.

<Hard Coat Layer>

In the transfer film for a reflective sheet 10, the hard coat layer 14 is formed on the support 12. In the following description, the hard coat layer will also be referred to as "HC layer".

In the transfer film for a reflective sheet 10, the HC layer 14 is a layer that functions as an underlayer for forming the first reflective layer 16R. In addition, in the reflective sheet 18, the HC layer 14 functions as a protective layer that protects the first reflective layer 16R and the second reflective layer 16L.

As the HC layer 14, a well-known HC layer can be used. In particular, it is preferable that the HC layer 14 includes a polymer. The kind of the polymer is not particularly limited.

For example, a well-known polymer can be used, and examples thereof include a (meth)acrylic polymer, polyester, polyurethane, and polyolefin.

The (meth)acrylic polymer is a generic name including an acrylic polymer and a methacrylic polymer.

It is preferable that the HC layer 14 includes a polymer obtained by polymerization of a monomer having a polymerizable group.

The kind of the polymerizable group is not particularly limited, and examples thereof include an unsaturated polymerizable group, an epoxy group, and an aziridinyl group. From the viewpoint of excellent polymerizability, an unsaturated polymerizable group is preferable, an ethylenically unsaturated polymerizable group is more preferable, and a (meth)acryloyl group is still more preferable.

"(meth)acryloyl group" is a generic name including an acryloyl group and a methacryloyl group.

The number of polymerizable groups in the monomer is not particularly limited and only needs to be 1 or more. From the viewpoint of excellent properties of the HC layer 14 such as scratch resistance, the number of polymerizable groups in the monomer is preferably 3 or more and more preferably 6 or more. The upper limit is not particularly limited and is 10 or less in many cases.

Examples of one preferable aspect of the monomer include a monomer having a cyclic structure.

The cyclic structure may be a monocyclic structure or a polycyclic structure. In the case of the polycyclic structure, the number of rings in the cyclic structure may be 2 or more and is preferably 2 or 3.

That is, as the cyclic structure, a polycyclic aliphatic structure (polycyclic aliphatic hydrocarbon) is preferable.

As the cyclic structure, a structure represented by Formula (1) is preferable from the viewpoint of further improving the effects of the present invention.

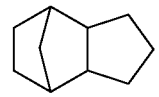

Formula (1)

As the monomer having a cyclic structure, a compound represented by Formula (2) is preferable.

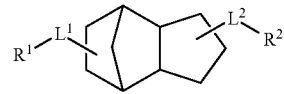

Formula (2)

$R^1$ and $R^2$ each independently represent a polymerizable group. The definition of the polymerizable group is as described above.

$L^1$ and $L^2$ each independently represent a single bond or a divalent linking group.

Examples of the divalent linking group include a divalent hydrocarbon group (for example, a divalent aliphatic hydrocarbon group such as an alkylene group having 1 to 10 carbon atoms, an alkenylene group having 1 to 10 carbon atoms, or an alkynylene group having 1 to 10 carbon atoms, or a divalent aromatic hydrocarbon group such as an arylene group), a divalent heterocyclic group, —O—, —S—, —NH—, —N(Q)-, —CO—, and a group including a combination thereof (for example, —O-divalent hydrocarbon group-, -divalent hydrocarbon group-O-divalent hydrocarbon group, or -divalent hydrocarbon group-O—CO—). Q represents a hydrogen atom or an alkyl group.

Examples of another preferable aspect of the monomer include a monomer represented by Formula (3).

$R^3$ represents a polymerizable group. The definition of the polymerizable group is as described above.

$L^3$ represents a single bond or a divalent linking group. Examples of the divalent linking group include divalent linking groups represented by $L^1$ and $L^2$.

$R^4$ represents a hydrogen atom or a substituent. As the substituent, a group other than a polymerizable group is preferable, and examples thereof include groups shown in the following substituent group W.

Substituent group W: a halogen atom, an alkyl group, an aryl group, a heteroaryl group, a cyano group, a hydroxyl group, a carboxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, an alkyl or arylsulfinyl group, an alky or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, and a combination thereof.

As the substituent represented by $R^4$, an alkyl group which may have a substituent, an aryl group which may have a substituent, or a heteroaryl group which may have a substituent is preferable. Examples of the substituent include groups shown in the substituent group W.

n represents an integer of 1 to 4.

Examples of still another preferable aspect of the monomer include a monomer represented by Formula (4).

The definitions of $R^3$, $L^3$, and $R^4$ are the same as the definitions of the respective groups in Formula (3).

X represents a hexavalent linking group. The hexavalent linking group is not particularly limited, and a group represented by Formula (5) is preferable.

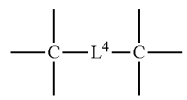

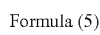

In Formula (5), $L^4$ represents a divalent linking group. Examples of the divalent linking group include divalent linking groups represented by L' and $L^2$.

m represents an integer of 1 to 6.

It is preferable that the HC layer 14 is a layer that is formed of a composition including a monomer having a polymerizable group.

The composition may include components other than the monomer.

Examples of the other components include a polymerization initiator. The kind of the polymerization initiator is not particularly limited and examples thereof include a thermal polymerization initiator and a photopolymerization initiator. As the polymerization initiator, an acylphosphine oxide compound or an oxime compound is preferable.

The content of the polymerization initiator in the composition is preferably 0.1 to 20 mass % and more preferably 0.5 to 5 mass % with respect to the total mass of the monomers.

The composition may include a solvent. Examples of the solvent include water and an organic solvent.

Examples of the organic solvent include a ketone, an alkyl halide, an amide, a sulfoxide, a heterocyclic compound, a hydrocarbon, an ester, and an ether.

A method of forming the HC layer 14 is not particularly limited, and examples thereof include a method of applying the above-described composition to the support, optionally performing a drying treatment, and subsequently curing the obtained coating film.

Examples of a method of applying the composition include a well-known method.

Examples of a method of the drying treatment include a heating treatment. The temperature of the heating treatment is preferably 30° C. to 100° C., and the heating time is preferably 15 seconds to 600 seconds.

As the curing treatment, an optimum method is selected depending on the monomers to be used, and examples thereof include a light irradiation treatment and a heating treatment.

The thickness of the HC layer 14 is not particularly limited and may be appropriately adjusted to a value that can exhibit the action as the underlayer for forming the first reflective layer 16R and the action as a protective layer for protecting the first reflective layer 16R and the second reflective layer 16L depending on the material for forming the HC layer 14.

In consideration of scratch resistance, it is preferable that the HC layer 14 has a thickness to some extent. The thickness of the HC layer 14 is preferably 1 µm or more, more preferably 2 µm or more, and still more preferably 3 µm or more.

It is preferable that the thickness of the HC layer 14 is 1 µm or more from the viewpoints of, for example, sufficiently exhibiting the function as the protective layer of the first reflective layer 16R and the second reflective layer 16L and obtaining excellent scratch resistance.

The thickness of the HC layer 14 is preferably 20 µm or less, more preferably 10 µm or less, and still more preferably 5 µm or less. It is preferable that the thickness of the HC layer 14 is 20 µm or less from the viewpoints of, for example, preventing the thicknesses of the transfer film for a reflective sheet 10 and the reflective sheet 18 from excessively increasing and preventing the occurrence of curling caused by curing shrinkage during the curing of the HC layer 14.

<First Reflective Layer and Second Reflective Layer>

In the reflective sheet 18, the first reflective layer 16R is formed on the surface of the HC layer 14, and the second reflective layer 16L is formed on the surface of the first reflective layer 16R.

Both the first reflective layer 16R and the second reflective layer 16L are cholesteric liquid crystal layers obtained by immobilizing a cholesteric liquid crystalline phase. Here, the first reflective layer 16R is formed on the surface of the HC layer 14 other than the second reflective layer 16L as the reflective layer.

In the following description, in a case where it is not necessary to distinguish between the first reflective layer 16R and the second reflective layer 16L, both of the first reflective layer 16R and the second reflective layer 16L will also be referred to as "reflective layer".

It is known that the cholesteric liquid crystalline phase exhibits selective reflection properties at a specific wavelength.

A center wavelength of selective reflection (selective reflection center wavelength) λ of a general cholesteric liquid crystalline phase depends on a helical pitch P in the cholesteric liquid crystalline phase and complies with a relationship of λ=n×P with an average refractive index n of the cholesteric liquid crystalline phase. Therefore, the selective reflection center wavelength can be adjusted by adjusting the helical pitch.

The selective reflection center wavelength of the cholesteric liquid crystalline phase increases as the helical pitch increases.

That is, the helical pitch refers to one pitch (period of helix) of the helical structure of the cholesteric liquid crystalline phase, in other words, one helical turn. That is, the helical pitch refers to the length in a helical axis direction in which a director (in the case of a rod-shaped liquid crystal, a major axis direction) of the liquid crystal compound constituting the cholesteric liquid crystalline phase rotates by 360°.

The helical pitch of the cholesteric liquid crystalline phase depends on the kind of the chiral agent used together with the liquid crystal compound and the concentration of the chiral agent added during the formation of the cholesteric liquid crystal layer. Therefore, a desired helical pitch can be obtained by adjusting these conditions.

The details of the adjustment of the pitch can be found in "Fujifilm Research & Development" No. 50 (2005), pp. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

In addition, the cholesteric liquid crystalline phase exhibits selective reflection properties with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystal layer is right, right circularly polarized light is reflected, and in a case where the helical twisted direction of the cholesteric liquid crystal layer is left, left circularly polarized light is reflected.

A turning direction of the cholesteric liquid crystalline phase can be adjusted by adjusting the kind of the liquid crystal compound that forms the cholesteric liquid crystal layer and/or the kind of the chiral agent to be added.

Figure 4:
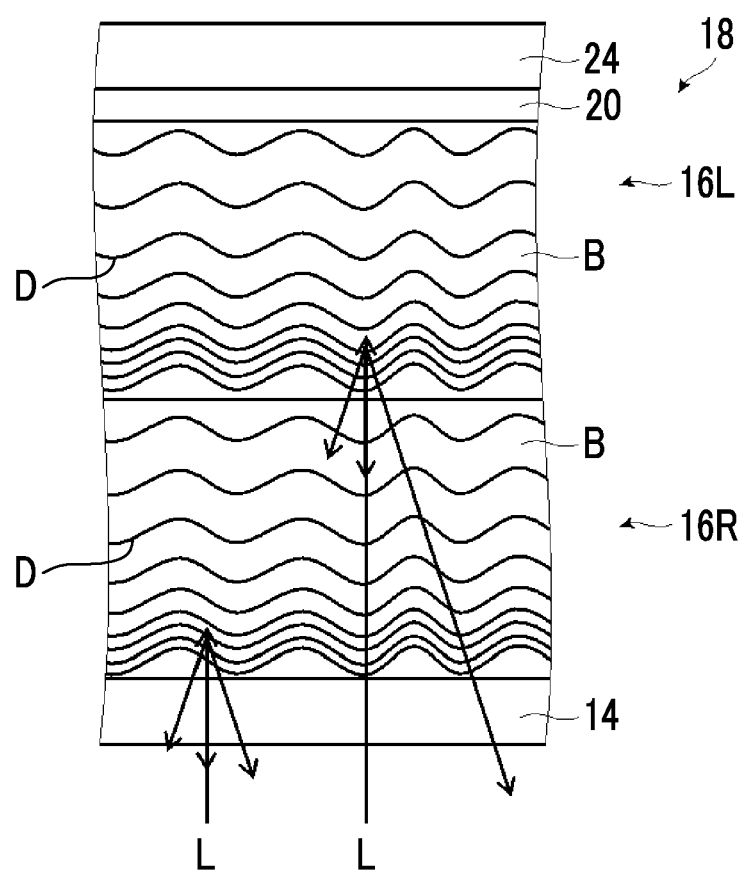
FIG. 4 is a conceptual diagram showing an action of the reflective sheet according to the present invention.

FIG. 4 conceptually shows the reflective layers (the first reflective layer 16R and the second reflective layer 16L) of the reflective sheet 18.

Here, in the transfer film for a reflective sheet 10 and the reflective sheet 18 according to the embodiment of the present invention, the reflective layer as the cholesteric liquid crystal layer has a pitch gradient structure in which a helical pitch changes in a thickness direction.

The helical pitch of the reflective layer gradually increases from the HC layer 14 side to the side opposite to the HC layer 14. That is, in the reflective sheet 18, the helical pitch of the reflective layer gradually increases from the HC layer 14 to the adhesive layer 20.

That is, in the reflective layer of the reflective sheet 18, a selective reflection center wavelength, that is, a wavelength range of light to be selectively reflected gradually increases from the HC layer 14 to the adhesive layer 20.

In the following description, in the cholesteric liquid crystal layer, the pitch gradient structure in which the helical pitch changes in the thickness direction will also be referred to as "PG structure".

In order to form the cholesteric liquid crystal layer having the PG structure, the chiral agent in which back isomerization, dimerization, isomerization, dimerization or the like occurs during light irradiation such that the helical twisting power (HTP) changes is used. By irradiating the liquid crystal composition with light having a wavelength at the HTP of the chiral agent changes before or during the curing of the liquid crystal composition for forming the cholesteric liquid crystal layer, the cholesteric liquid crystal layer having the PG structure can be formed.

In a chiral agent in which the HTP changes during light irradiation, in general, HTP decreases during light irradiation.

The irradiated light is absorbed by a material (in particular, the chiral agent) for forming the cholesteric liquid crystal layer.

In a case where the reflective layer of the transfer film for a reflective sheet 10 is formed, the light irradiation for changing the HTP of the chiral agent is performed from the side opposite to the HC layer 14 where any member is not provided, that is, from the top in FIG. 1. In particular, in order to prevent the reflective layer, such as the second reflective layer 16L, formed on the previously formed cholesteric liquid crystal layer from being affected by the previously formed reflective layer (cholesteric liquid crystal layer), it is preferable that light for changing the HTP of the chiral agent is emitted from the side opposite to the HC layer 14.

Accordingly, the irradiation dose of the light emitted from the reflective layer gradually decreases from the top in the drawing to the HC layer 14. That is, the amount of decrease in the HTP of the chiral agent gradually decreases from the top in the drawing to the HC layer 14.

Therefore, on the top in the drawing where the decrease in HTP is large, the induction of helix is small, and thus the helical pitch is long. On the HC layer 14 side where the decrease in HTP is small, helix is induced by the original HTP of the chiral agent, and thus the helical pitch decreases.

Accordingly, the helical pitch of the reflective layer gradually increases from the HC layer 14 side to the side opposite to the HC layer 14. That is, in the reflective sheet 18, the helical pitch of the reflective layer gradually increases from the HC layer 14 to the adhesive layer 20.

Therefore, in the reflective layer of the reflective sheet 18 according to the embodiment of the present invention, light having a longer wavelength is selectively reflected from the adhesive layer 20 side, and light having a shorter wavelength than the adhesive layer 20 side is selectively reflected from the HC layer 14 side. Accordingly, by using the cholesteric liquid crystal layer having the PG structure in which the helical pitch changes in the thickness direction, light in a wide wavelength range can be selectively reflected.

In addition, in a cross-section of the reflective layer (the first reflective layer 16R and the second reflective layer 16L) observed with a SEM, a stripe pattern in which bright portions B (bright lines) and dark portions D (dark lines)

derived from a cholesteric liquid crystalline phase are alternately laminated in the thickness direction (the up-down direction in FIG. 1) is observed.

Here, in a transfer film for a reflective sheet 10 according to the embodiment of the present invention, in the cross-section of each of the reflective layer as the cholesteric liquid crystal layer observed with a SEM, the bright portions B and the dark portions D have the flapping structure (wave-like structure) in which at least a part thereof forms periodical wave-like unevenness in a plane direction.

That is, in the present invention, the reflective layer has a cholesteric liquid crystal structure in which an angle between the helical axis and the surface of the reflective layer periodically changes. In other words, the reflective layer has a cholesteric liquid crystal structure, the cholesteric liquid crystal structure provides a stripe pattern including the bright portions B and the dark portions D in a cross-sectional view of the reflective layer that is observed with a SEM, and an angle between a normal line of a line formed by a dark portion and the surface of the reflective layer periodically changes.

It is preferable that the flapping structure is a structure in which at least one region M where an absolute value of a tilt angle of a continuous line of the bright portions B or the dark portions D that form the stripe pattern with respect to a plane of the cholesteric liquid crystal layer (reflective layer) is 5° or more is present, and a peak or valley having a tilt angle of 0° is specified at two points most adjacent to each other with the region M interposed therebetween in a plane direction.

The peak or valley having a tilt angle of 0° may have a protrusion shape or a recessed shape. However, the peak or valley may be a point having a stepwise shape or a rack shape as long as it has a tilt angle of 0°. In the flapping structure, it is preferable that the region M in which an absolute value of a tilt angle of a continuous line of the bright portions B or the dark portions D in the stripe pattern is 5° or more and the peak or valley in which the region M is interposed are repeated multiple times.

Figure 6:
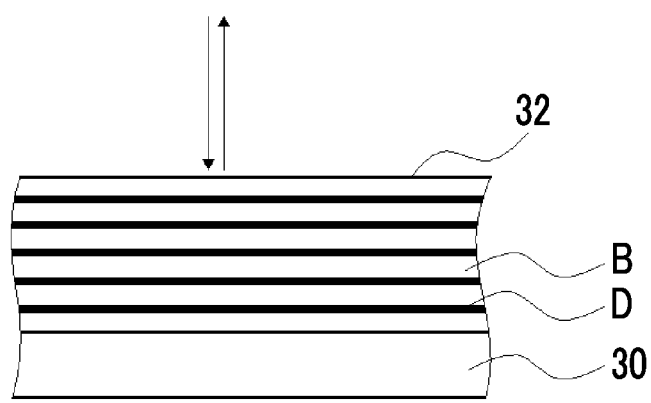
FIG. 6 is a conceptual diagram showing light reflection from a cholesteric liquid crystal layer.

FIG. 6 conceptually shows a cross-section of a layer obtained by immobilizing a general cholesteric crystalline phase.

As described above, in a case where a cross-section of a cholesteric liquid crystal layer 32 formed on a substrate 30 is observed with a SEM as shown in FIG. 6, the stripe pattern including the bright portions B and the dark portions D is observed. That is, in the cross-section of the cholesteric liquid crystal layer, a layered structure in which the bright portions B and the dark portions D are alternately laminated in the thickness direction is observed.

In the cholesteric liquid crystal layer, a structure in which the bright portion B and the dark portion D are repeated twice corresponds to the helical pitch. Therefore, the helical pitch of the cholesteric liquid crystal layer, that is, the reflective layer can be measured from a SEM cross-sectional view. That is, the structure in which the bright portion B and the dark portion D are repeated twice includes three bright portions and two dark portions.

In the cholesteric liquid crystal layer 32, in general, the stripe pattern (layered structure) including the bright portions B and the dark portions D is formed parallel to the surface of the substrate 30 as shown in FIG. 6. In this aspect, the cholesteric liquid crystal layer 32 exhibits specular reflection properties. That is, in a case where light is incident from the normal direction of the cholesteric liquid crystal layer 32, the light is reflected from the normal direction. The light is not likely to be reflected in the oblique direction, and diffuse reflectivity is poor (refer to arrows in FIG. 6).

Figure 7:
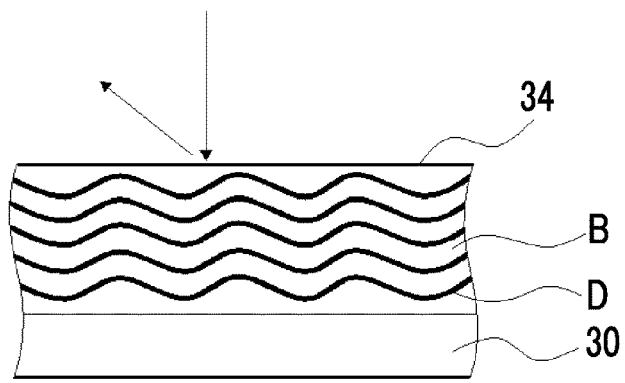
FIG. 7 is a conceptual diagram showing the light reflection from the cholesteric liquid crystal layer.

On the other hand, in a case where the bright portions B and the dark portions D have the flapping structure (undulated structure) as in the cholesteric liquid crystal layer 34 of which the cross-section is conceptually shown in FIG. 7 and light is incident from the normal direction of the cholesteric liquid crystal layer 34, a region where the helical axis of the liquid crystal compound is tilted as conceptually shown in FIG. 7. Therefore, in the cholesteric liquid crystal layer 34 in which the bright portions B and the dark portions D have the flapping structure, a part of incidence light is reflected in an oblique direction (refer to an arrow in FIG. 7).

That is, in the cholesteric liquid crystal layer obtained by immobilizing a cholesteric liquid crystalline phase, the bright portions B and the dark portions D have the flapping structure. As a result, a reflective layer having high diffuse reflectivity can be realized.

In the transfer film for a reflective sheet 10 and the reflective sheet 18 according to the embodiment of the present invention, in the cross-section of each of the first reflective layer 16R and the second reflective layer 16L as the cholesteric liquid crystal layer observed with a SEM, the bright portions B and the dark portions D derived from a cholesteric liquid crystalline phase have the flapping structure.

In the following description, the configuration in which the bright portions B and the dark portions D derived from a cholesteric liquid crystalline phase have the flapping structure in the cross-section of the cholesteric liquid crystal layer (reflective layer) observed with a SEM will also be simply referred to as "having the flapping structure".

The cholesteric liquid crystal layer having the flapping structure can be formed by forming the cholesteric liquid crystal layer on a formation surface on which an alignment treatment such as rubbing is not performed. Accordingly, in the example shown in the drawing, the first reflective layer 16R having the flapping structure can be formed by forming the first reflective layer 16R on the HC layer 14 on which the alignment treatment such as the rubbing treatment is not performed.

That is, in a case where the first reflective layer as the cholesteric liquid crystal layer is formed on the HC layer 14 on which the alignment treatment is not performed, there is no horizontal alignment restriction force with respect to the liquid crystal compound, and thus the alignment direction of the liquid crystal compound on the surface of the HC layer 14 varies depending on physical properties of the HC layer 14. In a case where the first reflective layer 16R is formed in this state, the helical axis of the liquid crystal compound forming the cholesteric liquid crystalline phase faces various directions. As a result, in the first reflective layer 16R, the stripe pattern including the bright portions B and the dark portions D have the flapping structure.

In addition, in a case where the cholesteric liquid crystal layer is formed on the cholesteric liquid crystal layer, the upper cholesteric liquid crystal layer follows the alignment state of the surface of the lower cholesteric liquid crystal layer. In other words, in a case where the cholesteric liquid crystal layer is formed on the cholesteric liquid crystal layer, the alignment state of the upper cholesteric liquid crystal layer follows the alignment state of the surface of the lower cholesteric liquid crystal layer.

Accordingly, in a case where the second reflective layer 16L as the cholesteric liquid crystal layer is formed on the first reflective layer 16R having the flapping structure, the second reflective layer 16L follows the alignment state of the surface of the first reflective layer 16R. As a result, the second reflective layer 16L is also formed as the cholesteric liquid crystal layer having the same flapping structure as that of the first reflective layer 16R. Therefore, in the transfer film for a reflective sheet 10 and the reflective sheet 18, the first reflective layer 16R and the second reflective layer 16L have the same flapping structure in which the periods of undulation, that is, the unevenness shapes of the flapping structure substantially match each other.

The amplitudes of undulation (the heights of undulation (unevenness)) in the first reflective layer 16R and the second reflective layer 16L may be the same as or different from each other.

In addition, in the reflective layer, the amplitudes of undulation may be the same as or different from each other, and a region having the same amplitude of undulation and a region having different amplitudes of undulation may be mixed.

In the second reflective layer 16L, the peak-to-peak distance and the amplitude (the height of undulation) of the flapping structure are also not particularly limited.

Here, in the cholesteric liquid crystal layer having the flapping structure, as the peak-to-peak distance decreases, higher diffusion reflection properties is exhibited. In addition, as the amplitude increases, higher diffuse reflectivity is exhibited.

From the viewpoint of obtaining excellent diffuse reflectivity, the average value of peak-to-peak distances in the flapping structure of the reflective layer is preferably 0.5 to 50 µm, more preferably 1.5 to 20 µm, and still more preferably 2.5 to 10 µm.

The second reflective layer 16L follows the flapping structure of the first reflective layer 16R. Therefore, the average value of the peak-to-peak distances of the second reflective layer 16L is substantially the same as the first reflective layer 16R.

Figure 8:
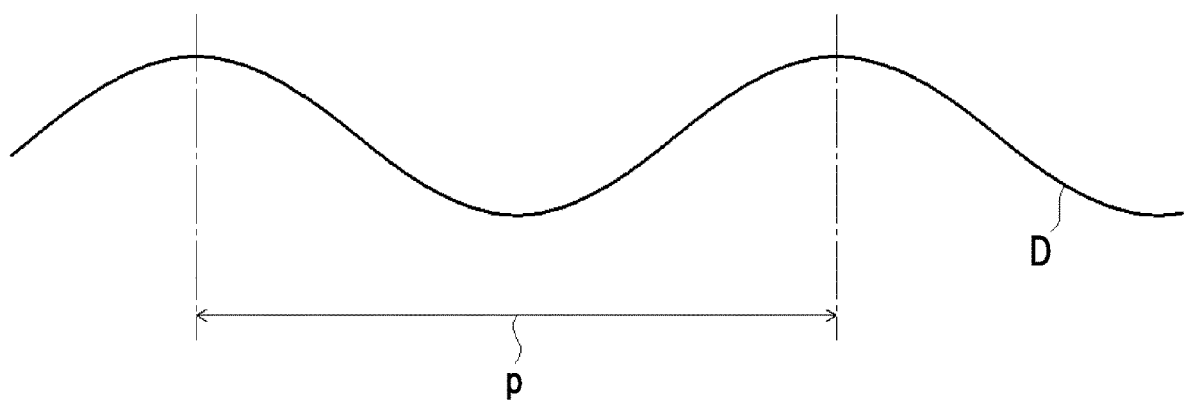
FIG. 8 is a conceptual diagram showing a peak-to-peak distance of a flapping structure.

The peak-to-peak distance of the flapping structure refers to a distance p between peaks of convex portions most adjacent to each other in the flapping structure as conceptually shown in FIG. 8.

Specifically, the average value of the peak-to-peak distances is obtained as follows. The distance in the plane direction of the cholesteric liquid crystal layer between peaks (or valleys) having a tilt angle of 0° at two positions that are most adjacent to each other with respect to a region M where the absolute value of a tilt angle with respect to a plane of the cholesteric liquid crystal layer is 5° or more is measured. By performing this measurement is performed on the length of 100 µm of the cholesteric liquid crystal layer in the cross-sectional major axis direction, the arithmetic mean value of all the thicknesses is obtained as the average value of the peak-to-peak distances.

In the present invention, the bright portions B and the dark portions D of the reflective layer are not limited to a configuration in which the entire area of all the bright portions B and the dark portions D have the flapping structure, and at least a part of the bright portions B and the dark portions D only needs to have the flapping structure.

That is, in the reflective sheet 18 according to the embodiment of the present invention, the bright portions B and the dark portions D in the reflective layer may include a region not having the flapping structure due to the formation of a defect portion or the like.

The thickness of the reflective layer (the first reflective layer 16R and the second reflective layer 16L) is not particularly limited and may be appropriately set depending on the wavelength or the like of light to be selectively reflected from the reflective layer.

The thickness of the reflective layer is preferably 1 to 20 µm, more preferably 3 to 15 µm, and still more preferably 6 to 12 µm.

In the transfer film for a reflective sheet 10 and the reflective sheet 18 according to the embodiment of the present invention, a wavelength range of light to be selectively reflected from the reflective layer (the first reflective layer 16R and the second reflective layer 16L) is not particularly limited and may be appropriately adjusted depending on, for example, the use of the reflective sheet.

In addition, turning directions of circularly polarized light reflected from the first reflective layer 16R and circularly polarized light reflected from the second reflective layer 16L may be the same as or different from each other.

In the example shown in the drawing, as a preferable aspect, the first reflective layer 16R and the second reflective layer 16L have the same selective reflection center wavelength, the first reflective layer 16R selectively reflects right circularly polarized light, and the second reflective layer 16L selectively reflects left circularly polarized light.

The absorbances of the reflective layer is not particularly limited.

Here, it is preferable that an absorbance of at least one of the first reflective layer 16R or the second reflective layer 16L with respect to light in a wavelength range of a maximum absorption wavelength of a chiral agent in the reflective layer ±10 nm is at least 3.2. For example, it is preferable that the absorbance of at least one of the first reflective layer 16R or the second reflective layer 16L with respect to light having a wavelength of 313 nm is 3.2 or higher.

By adjusting the absorbance of at least one of the first reflective layer 16R or the second reflective layer 16L with respect to light in a wavelength range of a maximum absorption wavelength of a chiral agent in the reflective layer ±10 nm to be 3.2 or higher, as the amount of isomerized light permeated into the reflective layer increases, the amount of light is attenuated, and an isomerized reached light amount distribution can be formed in the thickness direction, which is preferable from the viewpoint that an excellent PG structure can be formed.

In addition, in the present invention, a half-width of a reflection spectrum in a wavelength range where light is selectively reflected from the reflective layer (the first reflective layer 16R and the second reflective layer 16L) is not particularly limited.

From the viewpoint that, for example, light in a wider wavelength range can be reflected, the half-width in the integral reflection spectrum is preferably 100 nm or longer, more preferably 125 nm or longer, and still more preferably 150 nm or longer.

[Liquid Crystal Composition]

The reflective layer (the first reflective layer 16R and the second reflective layer 16L), that is, the cholesteric liquid crystal layer can be formed of a liquid crystal composition including a liquid crystal compound and a chiral agent.

(Liquid Crystal Compound)

It is preferable that the liquid crystal compound used for forming the cholesteric liquid crystal layer has two or more polymerizable groups. That is, a polymerizable liquid crystal compound is preferable. In addition, an average molar absorption coefficient in 300 to 400 nm is preferably lower than 5000.

The liquid crystal compound may be a rod-shaped liquid crystal compound or a disk-shaped liquid crystal compound and is preferably a rod-shaped liquid crystal compound.

Examples of the rod-shaped liquid crystal compound for forming a cholesteric liquid crystal structure include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the liquid crystal compound is preferably 1 to 6 and more preferably 1 to 3 in one molecule.

Examples of the liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO1995/22586, WO1995/24455, WO1997/00600, WO1998/23580, WO1998/52905, WO2016/194327A, WO2016/052367A, JP1989-272551A (JP-H1-272551A), JP1994-16616A (JP-H6-16616A), JP1995-110469A (JP-H7-110469A), JP1999-80081A (JP-H11-80081A), and JP2001-328973A.

In the liquid crystal composition, that is, the cholesteric liquid crystal layer, two or more liquid crystal compounds may be used in combination. In a case where two or more liquid crystal compounds are used in combination, there may be a case where the alignment temperature can be decreased.

In addition, the addition amount of the liquid crystal compound in the liquid crystal composition is not particularly limited and is preferably 80 to 99.9 mass %, more preferably 85 to 99.5 mass %, and still more preferably 90 to 99 mass % with respect to the solid content mass (mass excluding a solvent) of the liquid crystal composition.

(Chiral Agent: Optically Active Compound)

As the chiral agent used for forming the cholesteric liquid crystal layer, any well-known chiral agents can be used as long as the HTP thereof changes by light irradiation. A chiral agent having a molar absorption coefficient of 30000 or higher at a wavelength of 313 nm is preferably used.

The chiral agent has a function of causing a helical structure of a cholesteric liquid crystalline phase to be formed. The chiral compound may be selected depending on the purpose because a helical sense or a helical pitch induced from the compound varies.

As the chiral agent, a well-known compound can be used, but a compound having a cinnamoyl group is preferable. Examples of the chiral agent include compounds described in Liquid Crystal Device Handbook (No. 142 Committee of Japan Society for the Promotion of Science, 1989), Chapter 3, Article 4-3, chiral agent for TN or STN, p. 199), JP2003-287623A, JP2002-302487A, JP2002-80478A, JP2002-80851A, JP2010-181852A, and JP2014-034581A.

In general, the chiral agent includes an asymmetric carbon atom. However, an axially asymmetric compound or a planar asymmetric compound not having an asymmetric carbon atom can be used as the chiral agent. Examples of the axially asymmetric compound or the planar asymmetric compound include binaphthyl, helicene, paracyclophane, and derivatives thereof. The chiral agent may include a polymerizable group.

In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group included in the polymerizable chiral agent is the same as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

As the chiral agent, an isosorbide derivative, an isomannide derivative, or a binaphthyl derivative can be preferably used. As the isosorbide derivative, a commercially available product such as LC-756 (manufactured by BASF SE) may be used.

The content of the chiral agent in the liquid crystal composition is preferably 0.01 to 200 mol % and more preferably 1 to 30 mol % with respect to the amount of the liquid crystal compound.

(Polymerization Initiator)

It is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

As the polymerization initiator that can be used, an acylphosphine oxide compound or an oxime compound is preferable.

As the polymerization initiator, one kind may be used alone, or two or more kinds may be used in combination.

In a case where light irradiation for curing the reflective layer (cholesteric liquid crystal layer) is performed to form the reflective layer after performing light irradiation for changing the HTP of the chiral agent, it is preferable to use a photopolymerization initiator that inhibits polymerization during the light irradiation for changing the HTP of the chiral agent. In this case, the content of the photopolymerization initiator in the liquid crystal composition is preferably 0.05 to 3 mass % and more preferably 0.3 to 1.5 mass % with respect to the content of the liquid crystal compound. In addition, the light irradiation for changing the HTP of the chiral agent and the light irradiation for curing the reflective layer are performed at the same time, the content of the photopolymerization initiator in the liquid crystal composition is preferably 0.01 to 0.3 mass % and more preferably 0.01 to 0.2 mass % with respect to the content of the liquid crystal compound.

(Crosslinking Agent)

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The kind of the crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl) propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane.

In addition, depending on the reactivity of the crosslinking agent, a well-known catalyst can be used, and not only film hardness and durability but also productivity can be improved. As the catalyst, one kind may be used alone, or two or more kinds may be used in combination.

The content of the crosslinking agent in the liquid crystal composition is preferably 3 to 20 mass % and more preferably 5 to 15 mass % with respect to the solid content of the liquid crystal composition.

(Alignment Control Agent)

An alignment control agent contributing to the stable or rapid formation of a cholesteric liquid crystal structure with planar alignment may be added to the liquid crystal composition.

Examples of the alignment control agent include fluorine (meth)acrylate polymers described in paragraphs "0018" to "0043" of JP2007-272185A, and compounds represented by Formulae (I) to (IV) described in paragraphs "0031" to "0034" of JP2012-203237A.

As the alignment control agent, one kind may be used alone, or two or more kinds may be used in combination.

The addition amount of the alignment control agent in the liquid crystal composition is preferably 0.01 to 10 mass %, more preferably 0.01 to 5 mass %, and still more preferably 0.02 to 1 mass % with respect to the total mass of the liquid crystal compound.

(Surfactant)

The liquid crystal composition may include a surfactant.

It is preferable that the surfactant is a compound which can function as an alignment control agent contributing to the stable or rapid formation of a cholesteric structure with planar alignment. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

(Other Additives)

In addition, the liquid crystal composition may include at least one selected from various additives such as a polymerizable monomer. In addition, optionally, a polymerization inhibitor, an antioxidant, an ultraviolet absorber, a light stabilizer, a coloring material, metal oxide particles or the like can be added to the liquid crystal composition in a range where optical performance does not deteriorate.

(Solvent)

The solvent used for preparing the liquid crystal composition is not particularly limited and may be appropriately selected depending on the liquid crystal compound to be added to the composition and the like.

As a solvent, an organic solvent is preferably used. The organic solvent is not particularly limited and can be appropriately selected depending on the liquid crystal compound to be added to the composition and the like. Examples of the organic solvent include a ketone, an alkyl halide, an amide, a sulfoxide, a heterocyclic compound, a hydrocarbon, an ester, and an ether. Among these, a ketone is more preferable in consideration of an environmental burden.

As the solvent, one kind may be used alone, or two or more kinds may be used in combination.

[Formation of Reflective Layer]

The first reflective layer 16R (cholesteric liquid crystal layer) can be formed by dissolving the liquid crystal compound, the chiral agent, and the polymerization initiator and further the optionally added surfactant or the like in a solvent to prepare a liquid crystal composition, applying the liquid crystal composition to the HC layer 14, drying the liquid crystal composition to obtain a coating film, and irradiating the coating film with an actinic ray to cure the liquid crystal composition. As a result, the first reflective layer 16R having a cholesteric liquid crystal structure in which cholesteric regularity is immobilized can be formed.

By applying the liquid crystal composition to the HC layer 14 to form the first reflective layer 16R without performing an alignment treatment such as rubbing on the HC layer 14, the first reflective layer 16R having the flapping structure can be formed as described above. In addition, by performing light irradiation for changing the HTP of the chiral agent before or during the curing of the liquid crystal composition, the first reflective layer 16R having the PG structure can also be formed as described above.

Using the same method as described above, the second reflective layer 16L may be formed on the first reflective layer 16R after the formation of the first reflective layer 16R. The second reflective layer 16L follows the alignment of the surface of the first reflective layer 16R. Therefore, the second reflective layer 16L also has the flapping structure as described above. In addition, in a case where three or more reflective layers are formed, another reflective layer can be formed on the reflective layer using the same method as described above.

(Application and Alignment)

A method of applying the liquid crystal composition is not particularly limited and may be appropriately selected depending on properties of the coating composition, the materials for forming the HC layer 14 and the like.

Examples of the method of applying the liquid crystal composition include a wire bar coating method, a curtain coating method, an extrusion coating method, a direct gravure coating method, a reverse gravure coating method, a die coating method, a spin coating method, a dip coating method, a spray coating method, and a slide coating method.

By heating the applied liquid crystal composition, liquid crystal molecules are aligned. The heating temperature is preferably 200° C. or lower and more preferably 130° C. or lower. Through the alignment treatment, a structure in which the liquid crystal compound is twisted and aligned to have a helical axis can be obtained.

(Curing of Liquid Crystal Composition)

Next, by polymerizing the aligned liquid crystal compound, the liquid crystal composition can be cured to form a reflective layer. Regarding the polymerization of the liquid crystal compound, thermal polymerization or photopolymerization may be performed, and photopolymerization is preferable.

It is preferable that light irradiation for curing the liquid crystal composition is performed by ultraviolet irradiation. The illuminance of ultraviolet light is preferably 15 to 1500 mW/cm$^2$ and more preferably 100 to 600 mW/cm$^2$. In addition, the irradiation energy of ultraviolet light is preferably 20 mJ/cm$^2$ to 50 J/cm$^2$ and more preferably 100 to 1500 mJ/cm$^2$.

A wavelength of ultraviolet light to be irradiated may be appropriately selected depending on the liquid crystal compound in the liquid crystal composition and the like. In order to cure the liquid crystal composition, a light source having an emission wavelength of 200 to 430 nm is preferable, and a light source having an emission wavelength of 300 to 430 nm is more preferable. In addition, during ultraviolet irradiation, from the viewpoint of preventing a decomposition, side reaction, or the like of a material to be used, for example, a short wavelength cut filter may be used to suppress the transmittance of light having a wavelength of 300 nm or shorter to be 20% or lower.

In a case where the cholesteric liquid crystal layer having the PG structure is formed, light irradiation for changing the HTP of the chiral agent may be performed before the curing of the liquid crystal composition. Alternatively, in a case where the cholesteric liquid crystal layer having the PG structure is formed, light irradiation for changing the HTP of the chiral agent and light irradiation for curing the liquid crystal composition may be performed at the same time. As described above, light for changing the HTP of the chiral agent is emitted from the side opposite to the support 12.

During the formation of the reflective layer, in order to promote the change of the HTP of the chiral agent, it is preferable that ultraviolet irradiation is performed after heating. During the ultraviolet irradiation for promoting the change of the HTP of the chiral agent, the oxygen concentration is not particularly limited. Accordingly, the ultraviolet irradiation may be performed in an oxygen atmosphere or in a low oxygen atmosphere. Further, it is preferable that the ultraviolet irradiation for promoting the photopolymerization reaction of the liquid crystal compound is performed under heating and/or in a low oxygen atmosphere.

In order to prevent the cholesteric liquid crystal layer from being disordered, it is preferable that the temperature during the ultraviolet irradiation is maintained in a temperature range where the cholesteric liquid crystalline phase is exhibited. Specifically, the temperature during the ultraviolet irradiation is preferably 25° C. to 140° C. and more preferably 30° C. to 100° C.

In addition, the low oxygen atmosphere during the ultraviolet irradiation may be formed by reducing the oxygen concentration in the atmosphere using a well-known method such as nitrogen substitution. The oxygen concentration is preferably 5000 ppm or lower, more preferably 100 ppm or lower, and still more preferably 50 ppm or lower.

From the viewpoint of stability, the polymerization degree after curing the liquid crystal composition is preferably high, and is preferably 50% or higher and more preferably 60% or higher. The polymerization degree can be determined by measuring a consumption ratio between polymerizable functional groups using an infrared absorption spectrum.

In the example shown in the drawing, the HC layer 14 and the first reflective layer 16R are directly laminated, but the present invention is not limited thereto.

That is, in the reflective sheet 18 and the like according to the embodiment of the present invention, an adhesion layer, a light interference layer, an antireflection layer, and the like may be optionally provided between the HC layer 14 and the first reflective layer 16R.

However, from the viewpoint of improving the pencil hardness such that the protection of the reflective layer by the HC layer 14 can be improved, it is preferable that the HC layer 14 and the first reflective layer 16R (cholesteric liquid crystal layer) are directly laminated as in the example shown in the drawing.

<Adhesive Layer and Substrate>

In the reflective sheet 18, the substrate 24 is bonded to the second reflective layer 16L (cholesteric liquid crystal layer) through the adhesive layer 20.

The substrate 24 is not particularly limited, and various well-known sheet-shaped materials such as a resin film, a glass plate, a metal plate, paper, or cloth can be used. In addition, the substrate 24 may have light-transmitting property or does not allow transmission of light depending on the use of the reflective sheet 18.

In addition, in the reflective sheet 18 according to the embodiment of the present invention, the substrate 24 may be a member for forming various optical devices and optical elements, for example, an exposure device, an image reading device such as a scanner, an image recording device such as a laser printer or a copying machine, an image display apparatus such as an optical sensor, an organic electroluminescent display, or a liquid crystal display, an imaging apparatus, or an lighting device such as a lamp. That is, the reflective sheet 18 according to the embodiment of the present invention including the substrate 24 as the member for forming an optical device, an optical element, or the like may be incorporated into the optical device as a part of the member for forming the optical device.

For example, the reflective sheet 18 according to the embodiment of the present invention can be used as a decorative material in a lighting apparatus that emits white light. In this case, after removing a cover that covers a light source of the lighting apparatus, the transfer film for a reflective sheet 10 according to the embodiment of the present invention is bonded to an inner surface of the cover using the adhesive layer 20. Next, the support 12 is peeled off, and the cover is attached to the lighting apparatus again. In this case, the cover of the lighting apparatus is the substrate 24 in the reflective sheet 18 according to the embodiment of the present invention, and the reflective sheet 18 according to the embodiment of the present invention is incorporated into the lighting apparatus. In the lighting apparatus including the reflective sheet 18 according to the embodiment of the present invention, for example, in a case where the reflective layer reflects blue light, the emitted light is yellowish in a state where the lighting is on, which is easy to eyes. On the other hand, in a state where the lighting is off during the daytime, blue decoration in the lighting apparatus can be enjoyed.

In the reflective sheet 18 according to the embodiment of the present invention, the adhesive layer 20 is not particularly limited. Depending on a material for forming the second reflective layer 16L (cholesteric liquid crystal layer) and the substrate 24, various well-known adhesive can be used as long both of the layers can be bonded to each other. In a case where the substrate 24 has light-transmitting property, it is preferable that the adhesive layer 20 also has light-transmitting property.

Accordingly, the adhesive layer 20 may be a layer consisting of an adhesive that has fluidity during bonding and is a solid after bonding, a layer consisting of a pressure sensitive adhesive that is a gel-like (rubber-like) flexible solid during bonding and of which the gel state does not change after bonding, or a layer consisting of a material having characteristics of both the adhesive and the pressure sensitive adhesive.

Here, as the adhesive layer 20, an ultraviolet curable adhesive such as a (meth)acrylic adhesive, an epoxy-based adhesive, or a polyurethane-based adhesive is suitably used. That is, it is preferable that the adhesive layer 20 is obtained by curing an ultraviolet curable adhesive.

By using the ultraviolet curable adhesive as the adhesive layer 20, the pencil hardness of the HC layer 14 can be improved, and the protection function of the reflective layer by the HC layer 14 can be further improved.

The thickness of the adhesive layer 20 is not particularly limited. Depending on a material for forming the adhesive layer 20, the thickness where a sufficient adhesive strength between the second reflective layer 16L (transfer film for a reflective sheet 10) and the substrate 24 can be obtained may be appropriately set.

The thickness of the adhesive layer 20 is preferably 30 μn or less, more preferably 10 μm or less, and still more preferably 5 μm or less.

It is preferable that the thickness of the adhesive layer 20 is 30 μm or less from the viewpoints of, for example, improving the hardness of the reflective sheet such that the protection function of the reflective layer by the HC layer 14 can be improved and preventing the thickness of the reflective sheet 18 from unnecessarily increasing.

As long as the required adhesive strength can be obtained, the lower limit of the thickness of the adhesive layer 20 is not particularly limited and is preferably 0.1 μm or more, more preferably 1 μm or more, and still more preferably 3 μm or more.

The reflective sheet 18 according to the embodiment of the present invention includes the HC layer 14, the reflective layer (the first reflective layer 16R and the second reflective layer 16L), the adhesive layer 20, and the substrate 24 in this order.

In addition, the reflective layer is a cholesteric liquid crystal layer, the bright portions B and the dark portions D derived from a cholesteric liquid crystalline phase have the flapping structure, and the reflective layer has the PG structure in which the helical pitch of the cholesteric liquid crystalline phase increases from the HC layer 14 side to the adhesive layer 20 side.

The reflective sheet 18 according to the embodiment of the present invention has the above-described configuration such that a reflective sheet including a cholesteric liquid crystal layer and having a wide reflection wavelength range, satisfactory diffuse reflectivity, high reflectivity, and excellent scratch resistance can be realized.

In the reflective sheet 18 according to the embodiment of the present invention, as the substrate 24, various substrates can be used, and a substrate that does not allow transmission of light may also be used. Therefore, in the reflective sheet 18 according to the embodiment of the present invention, the HC layer 14 side is the incidence side of light to be reflected.

The reflective layer as the cholesteric liquid crystal layer has the wave-like structure such that satisfactory diffuse reflectivity can be exhibited. In addition, the reflective layer has the PG structure such that the selective reflection wavelength range can be widened.

Figure 5:
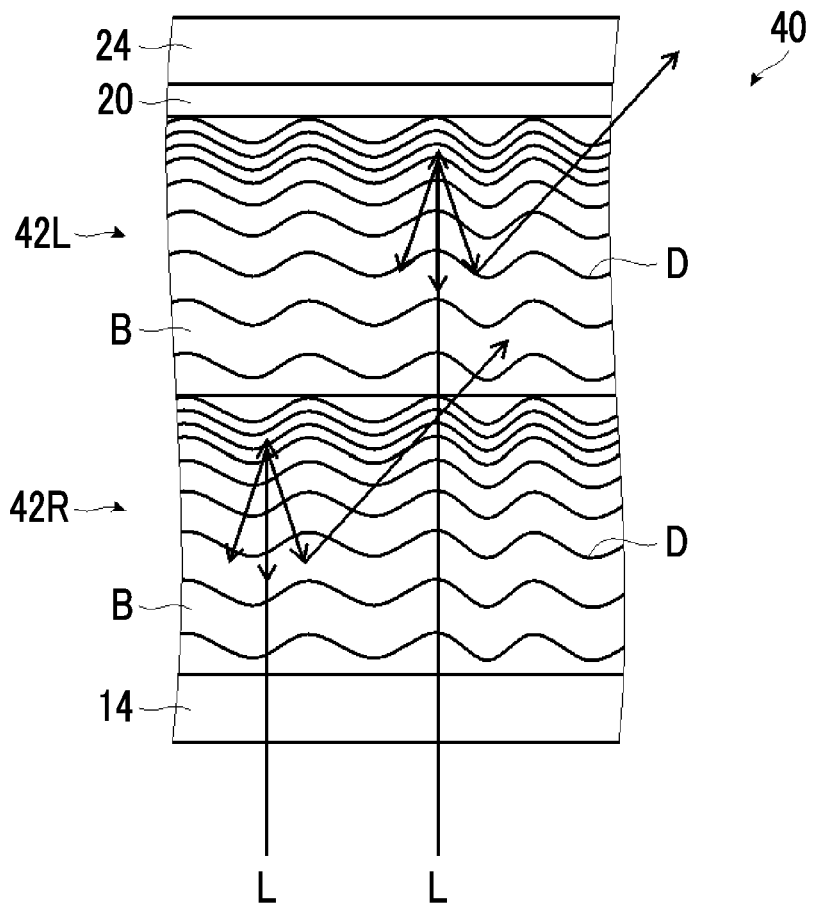
FIG. 5 is a conceptual diagram showing an action of the reflective sheet in the reflective sheet.

Here, in a reflective sheet 40 that is conceptually shown in FIG. 5, the reflectivity decreases in a case where the PG structure has a configuration in which the helical pitch of the cholesteric liquid crystalline phase decreases from the HC layer 14 side to the adhesive layer 20 side as in a first reflective layer 42R and a second reflective layer 42L.

The reflective sheet 40 in FIG. 5 has the same configuration as the reflective sheet 18 according to the embodiment of the present invention shown in FIGS. 2 and 4, except that the size of the helical pitch in the PG structure of the reflective layer (cholesteric liquid crystal layer) is opposite in the thickness direction.

In the configuration shown in FIG. 5, light L incident into the HC layer 14 from the normal direction travels from the HC layer 14 to the adhesive layer 20 in the first reflective layer 42R and the second reflective layer 42L.

In the cholesteric liquid crystal layer, as the helical pitch decreases, light having a shorter wavelength is selectively reflected, and as the helical pitch increases, the reflection wavelength increases. Accordingly, in the first reflective layer 42R and the second reflective layer 42L, in the selective reflection wavelength range, light having a shorter wavelength is reflected from the adhesive layer 20 side, and light having a longer wavelength is reflected from the HC layer 14 side.

In addition, the first reflective layer 42R and the second reflective layer 42L are the cholesteric liquid crystal layers having the flapping structure. Therefore, the incident light L is diffuse-reflected as shown in FIG. 5.

The diffuse-reflected light having a shorter wavelength travels to a region where the helical pitch of the PG structure is long.

Here, typically, the light having a shorter wavelength is not reflected from the region where the helical pitch of the PG structure is long. However, the light having a shorter wavelength is diffuse-reflected and thus is obliquely incident into the bright portions B and the dark portions D in the region where the helical pitch of the PG structure is long.

As is well-known, in the cholesteric liquid crystal layer, in a case where light is obliquely incident into the bright portions B and the dark portions D, so-called short-wavelength shift (blue shift) in which the selective reflection wavelength is shifted to the shorter wavelength side occurs.

Therefore, the light having a shorter wavelength that is incident into the region where the helical pitch of the PG structure is long is reflected again from the region where the helical pitch of the PG structure is long by the short-wavelength shift as indicated by an arrow, and transmits through the first reflective layer 42R and the second reflective layer 42L.

As a result, in the reflective sheet 40 that is conceptually shown in FIG. 5, the light transmittance increases and the reflectivity decreases in the configuration in which the helical pitch of the PG structure decreases from the HC layer 14 side to the adhesive layer 20 side as in the first reflective layer 42R and the second reflective layer 42L.

On the other hand, in the reflective sheet 18 according to the embodiment of the present invention, conversely, the first reflective layer 16R and the second reflective layer 16L have the PG structure in which the helical pitch of the cholesteric liquid crystalline phase increases from the HC layer 14 side to the adhesive layer 20 side.

The light L incident into the HC layer 14 from the normal direction also travels from the HC layer 14 to the adhesive layer 20 in reflective layer.

In the cholesteric liquid crystal layer, as the helical pitch decreases, light having a shorter wavelength is selectively reflected, and as the helical pitch increases, the reflection wavelength increases. Accordingly, in the first reflective layer 16R and the second reflective layer 16L, in the selective reflection wavelength range, light having a shorter wavelength is reflected from the HC layer 14 side, and light having a longer wavelength is reflected from the adhesive layer 20 side.

The diffuse-reflected light travels to a region where the helical pitch of the PG structure is short. That is, the light reflected from the reflective layer travels to the region where light having a shorter wavelength is reflected.

Accordingly, the reflected light is obliquely incident into the bright portions B and the dark portions D by diffuse-reflection, and the reflection wavelength further decreases even in a case where the short-wavelength shift occurs. As shown in FIG. 4, the light is not reflected again.

As a result, according to the present invention, the light in the selective reflection wavelength range of the first reflective layer 16R and the second reflective layer 16L that is incident from the HC layer 14 can be reflected at a high reflectivity.

Further, the reflective sheet 18 according to the embodiment of the present invention is obtained by bonding the transfer film for a reflective sheet 10 according to the embodiment of the present invention to the substrate 24 and peeling off the support 12.

Accordingly, the first reflective layer 16R and the second reflective layer 16L (cholesteric liquid crystal layer) are covered with the HC layer 14 as the formation surface. Therefore, the HC layer 14 functions as a protective layer of the first reflective layer 16R and the second reflective layer 16L.

Accordingly, with the reflective sheet 18 according to the embodiment of the present invention, damages to the first reflective layer 16R and the second reflective layer 16L that are optically most important can be prevented, and a reflective sheet having excellent mechanical strength or the like can be realized. In addition, the surface is the HC layer, the hardness is sufficient, and the surface scratch resistance is also excellent.

That is, the reflective sheet 18 according to the embodiment of the present invention exhibits not only satisfactory diffuse reflectivity due to the flapping structure and wide selective wavelength range due to the PG structure but also high reflectivity, sufficient hardness, and excellent surface scratch resistance as a reflective sheet including a cholesteric liquid crystal layer.

In the reflective sheet 18 (transfer film for a reflective sheet 10) according to the embodiment of the present invention, the wavelength range of light to be selectively reflected from the reflective layer, that is, the cholesteric reflecting layer is not limited. Accordingly, the reflection wavelength range of the reflective layer may be appropriately set depending on the use of the reflective sheet 18, the kind of the substrate 24, and the like.

Here, in the reflective sheet 18 according to the embodiment of the present invention, it is preferable that, in a case where light is incident from the HC layer 14 side, for example, an integral reflectivity with respect to light having a wavelength of 450 nm is 50% to 90% and an integral reflectivity with respect to light having a wavelength of 500 nm is 30% to 80%. That is, in the reflective sheet 18 according to the embodiment of the present invention, it is preferable that the reflective layer selectively reflects light in a wavelength range of the wavelength of blue light to an intermediate wavelength of blue light and green light.

<Use of Reflective Sheet>

The reflective sheet according to the embodiment of the present invention can be used for various applications such as a decorative sheet, a light reflection member, a light diffusion plate, a half mirror, or a transparent screen.

In addition, as described above, depending on the substrate 24, the reflective sheet according to the embodiment of the present invention may be used as a member for forming an optical device in a state where it is incorporated into the optical device.

EXAMPLES

Hereinafter, the present invention will be described in detail using Examples. Materials, reagents, amounts thereof, proportions thereof, operations, and the like shown in the following examples can be appropriately changed as long as they do not depart from the scope of the present invention. Accordingly, the present invention is not limited to the following examples.

<Formation of HC layer 1>

As a support, a PET film (COSMOSHINE A4100, manufactured by Toyobo Co., Ltd.) having a thickness of 50 µm was prepared. This PET film includes an easy adhesion layer on one surface.

An coating solution for a HC layer 1 having the following composition was applied to a surface of the PET film where the easy adhesion layer was not provided using a #3.6 wire bar coater. Next, the laminate was applied was dried at 45° C. for 60 seconds and was irradiated with ultraviolet light at 500 mJ/cm² at 25° C. using an ultraviolet irradiation device. As a result, the support 1 with the HC layer 1 having a thickness of 1.4 µm was prepared.

| [Coating Solution for HC layer 1] | |
|---|---|
| KAYARAD PET30 (manufactured by Nippon Kayaku Co., Ltd.) | 50 parts by mass |
| DCP (NK ESTER DCP, manufactured by Shin-Nakamura Chemical Co., Ltd.) | 50 parts by mass |
| Photopolymerization Initiator A | 3.0 parts by mass |
| Photopolymerization Initiator B | 1.0 part by mass |
| The following surfactant F1 | 0.01 parts by mass |
| Methyl ethyl ketone | 156 parts by mass |
| Cyclohexanone | 156 parts by mass |

KAYARAD PET-30 (mixture of the following two compounds)

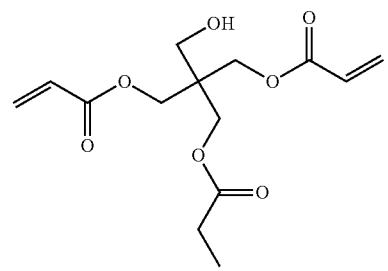

-continued

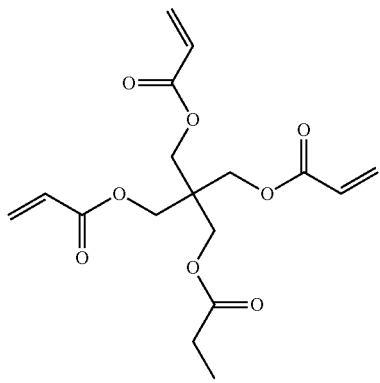

DCP

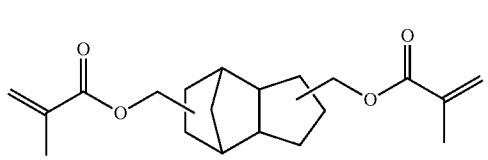

Photopolymerization Initiator A: IRGACURE-907 (manufactured by BASF SE)

Photopolymerization initiator B: KAYACURE DETX (manufactured by Nippon Kayaku Co., Ltd.)

Surfactant F1

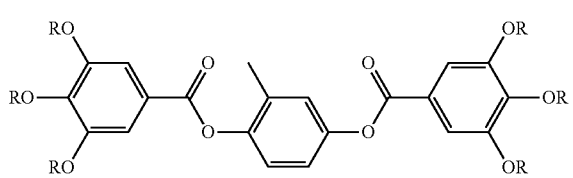

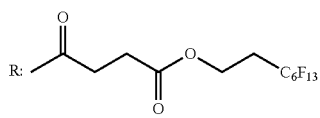

<Chiral Agent>

The following chiral agents A and B were prepared. Using any one of the chiral agents, a first reflective layer and a second reflective layer described below were formed.

Chiral Agent A

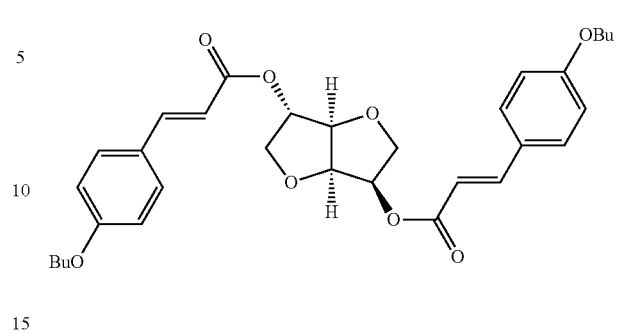

Chiral Agent B

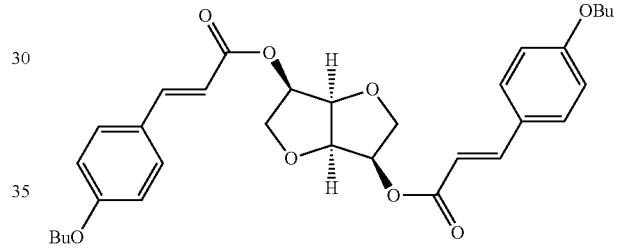

The chiral agent A is a chiral agent that forms a right-handed helix. In addition, the chiral agent B is a chiral agent that forms a left-handed helix. The chiral agents A and B are chiral agents having a cinnamoyl group.

Example 1

[Formation of First Reflective Layer]

A composition shown below was stirred and dissolved in a container held at 25° C. to prepare a coating solution for a reflective layer Ch-B.

| (Coating Solution for Reflective Layer Ch-B) | |
|---|---|
| Methyl ethyl ketone | 150.6 parts by mass |
| Mixture of the following rod-shaped liquid crystal compounds | 100.0 parts by mass |
| Photopolymerization Initiator B | 0.50 part by mass |
| Chiral agent B | 11.00 parts by mass |
| The above-described surfactant F1 | 0.027 parts by mass |
| The following surfactant F2 | 0.067 parts by mass |

Mixture of Rod-Shaped Liquid Crystal Compounds

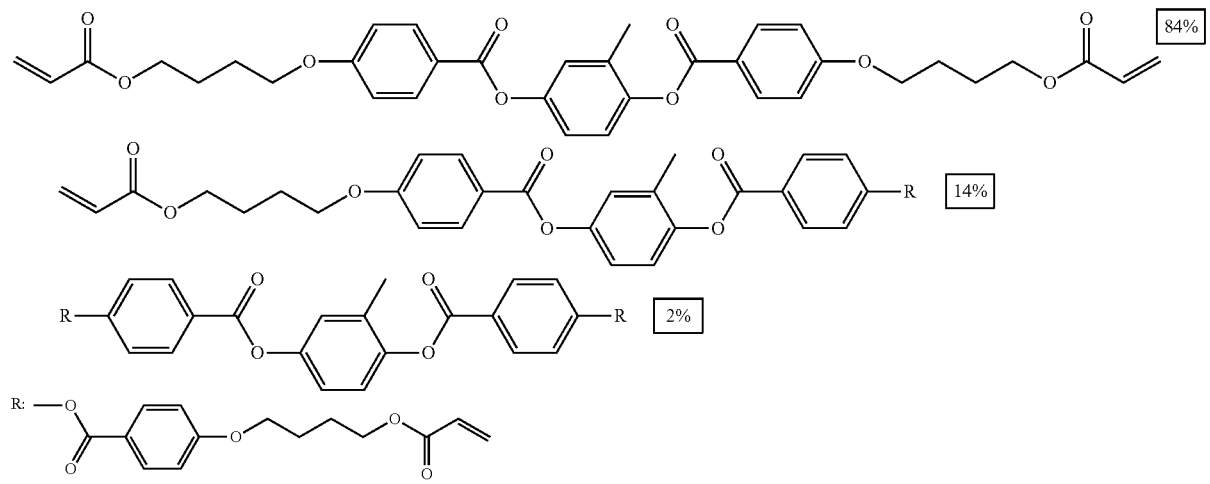

In the above-described mixture, a numerical value is represented by mass %. In addition, R represents a group to be bonded to an oxygen atom. In addition, an average molar absorption coefficient of the rod-shaped liquid crystal compound at a wavelength of 300 to 400 nm was 140/mol·cm.

Surfactant F2

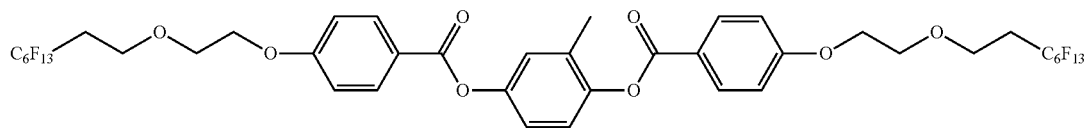

The prepared coating solution for a reflective layer Ch-B was applied using a #6 wire bar coater to the surface of the support including the prepared HC layer, and was dried at 105° C. for 60 seconds.

Next by irradiating the coating film with light from a metal halide lamp in a low oxygen atmosphere (100 ppm or lower) at 40° C. and an irradiation dose of 60 mJ through an optical filter SH0350 (manufactured by Asahi Spectra Co., Ltd.) and further irradiating the coating film with light from a metal halide lamp at 100° C. and an irradiation dose of 500 mJ, a first reflective layer as a cholesteric liquid crystal layer was prepared. The light irradiation was performed from the first reflective layer side.

[Formation of Second Reflective Layer]

A composition shown below was stirred and dissolved in a container held at 25° C. to prepare a coating solution for a reflective layer Ch-A.

| (Coating Solution for reflective layer Ch-A) | |
| --- | --- |
| Methyl ethyl ketone | 144.9 parts by mass |
| Mixture of the rod-shaped liquid crystal compounds | 100.0 parts by mass |
| Photopolymerization Initiator A | 0.02 parts by mass |
| Photopolymerization Initiator B | 1.00 part by mass |
| Chiral agent A | 6.10 parts by mass |
| The above-described surfactant F1 | 0.027 parts by mass |
| The above-described surfactant F2 | 0.067 parts by mass |

The prepared coating solution for a reflective layer Ch-A was applied using a #14 wire bar coater to the surface of the prepared first reflective layer, and was dried at 105° C. for 60 seconds.

Next by irradiating the coating film with light from a metal halide lamp in a low oxygen atmosphere (100 ppm or lower) at 75° C. and an irradiation dose of 60 mJ through an optical filter (SH0350, manufactured by Asahi Spectra Co., Ltd.) and further irradiating the coating film with light from a metal halide lamp at 100° C. and an irradiation dose of 500 mJ, a second reflective layer as a cholesteric liquid crystal layer was formed, and a transfer film for a reflective sheet 1 was prepared. The light irradiation was performed from the second reflective layer side.

[Preparation of Reflective Sheet]

As the substrate, a polycarbonate plate material having a thickness of 1.0 mm was prepared.

Using a pressure sensitive adhesive (SK2057, manufactured by Soken Chemical & Engineering Co., Ltd., thickness: 25 μm), the substrate and the prepared transfer film for a reflective sheet 1 were bonded to each other. The transfer film for a reflective sheet 1 was bonded to the substrate in a state where the second reflective layer was directed to the substrate.

Next, by peeling off the support from the HC layer, a reflective sheet according to Example 1 was prepared.

Comparative Example 1

[Preparation of Temporary Transfer Member]

A peelable PET film (COSMOSHINE A4100, manufactured by Toyobo Co., Ltd.) was prepared.

Using the same method as that of Example 1, the second reflective layer, the first reflective layer, and the HC layer were formed in this order on a surface of the PET film where the easy adhesion layer was not formed. As a result, a temporary transfer member 1 including the PET film, the second reflective layer, the first reflective layer, and the HC layer was prepared.

[Preparation of Transfer Film for Reflective Sheet 2]

Another PET film (COSMOSHINE A4100, manufactured by Toyobo Co., Ltd.) was prepared.

A pressure sensitive adhesive (SK2057, manufactured by Soken Chemical & Engineering Co., Ltd., thickness: 25 μm) was bonded to the easy adhesion layer of the PET film. A separator of the pressure sensitive adhesive was peeled off, and the surface of the pressure sensitive adhesive layer was hit by Kimwipe in a state where the pressure sensitive adhesive layer was exposed. As a result, a weak adhesion surface where the adhesive force of the pressure sensitive adhesive layer surface was reduced was formed.

The temporary transfer member 1 was bonded to the weak adhesion surface in a state where the HC layer was directed to the weak adhesion surface, and the PET film was peeled off from an interface between the second reflective layer and the PET film. As a result, a transfer film for a reflective sheet 2 including the PET film, the pressure sensitive adhesive layer, the HC layer, the first reflective layer, and the second reflective layer was prepared.

[Preparation of Reflective Sheet]

As the substrate, a polycarbonate plate material having a thickness of 1.0 mm was prepared.

Using a pressure sensitive adhesive (SK2057, manufactured by Soken Chemical & Engineering Co., Ltd., thickness: 25 μm), the substrate and the prepared transfer film for a reflective sheet 2 were bonded to each other. The transfer film for a reflective sheet 2 was bonded to the substrate in a state where the second reflective layer was directed to the substrate.

Next, by peeling off the PET film and the pressure sensitive adhesive layer from an interface between the HC layer and the weak adhesion surface, a reflective sheet according to Comparative Example 1 including the substrate, the adhesive layer, the first reflective layer, the second reflective layer, and the HC layer was prepared.

Examples 2 and 3

Reflective sheets were prepared using the same method as that of Example 1, except that the thicknesses of the adhesive layers were set to 10 μm (Example 2) and 5 μm (Example 3).

Example 4

A reflective sheet was prepared using the same method as that of Example 1, except that the adhesive layer was formed using an ultraviolet curable adhesive (ARONIX UV-3701, manufactured by Toagosei Co., Ltd.).

The thickness of the adhesive layer was set to 3 μm.

Example 5

The following coating solution for a HC layer 2 was prepared.

[Coating Solution for HC layer 2]

The coating solution for a HC layer 2 was prepared using the same preparation method as that of the coating solution for a HC layer 1, except that 50 parts by mass of KAYARAD PET 30 and 50 parts by mass of DCP were changed to 100 parts by mass of KAYARAD PET 30.

The coating solution for a HC layer 2 was applied to a surface of the support (PET film) where the easy adhesion layer was not provided using a #3.6 wire bar coater. Next, the laminate was applied was dried at 45° C. for 60 seconds and was irradiated with ultraviolet light at 500 mJ/cm² at 25° C. using an ultraviolet irradiation device. As a result, a support 2 with the HC layer 2 having a thickness of 1.4 μm was prepared.

A reflection film was prepared using the same method as that of Example 1, except that the support 2 was used.

Example 6

The following coating solution for a HC layer 3 was prepared.

[Coating Solution for HC layer 3]

The coating solution for a HC layer 3 was prepared using the same preparation method as that of the coating solution for a HC layer 1, except that 50 parts by mass of KAYARAD PET 30 and 50 parts by mass of DCP were changed to 100 parts by mass of KAYARAD DPHA (manufactured by Nippon Kayaku Co., Ltd.).

KAYARAD DPHA

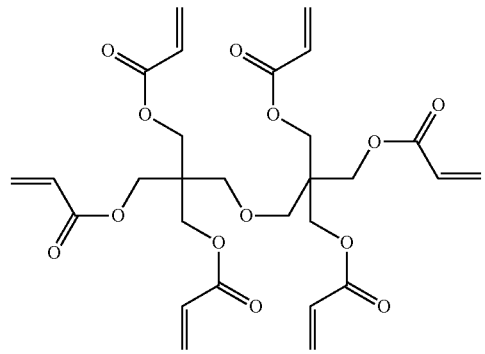 [SMILES: C=CC(=O)OCC(COCC(COC(=O)C=C)(COC(=O)C=C)COC(=O)C=C)(COC(=O)C=C)COC(=O)C=C]

The coating solution for a HC layer 3 was applied to a surface of the support (PET film) where the easy adhesion layer was not provided using a #3.6 wire bar coater. Next, the laminate was applied was dried at 45° C. for 60 seconds and was irradiated with ultraviolet light at 500 mJ/cm² at 25° C. using an ultraviolet irradiation device. As a result, a support 3 with the HC layer 3 having a thickness of 1.4 μm was prepared.

A reflection film was prepared using the same method as that of Example 1, except that the support 3 was used.

Example 7

The following coating solution for a HC layer 4 was prepared.

[Coating Solution for HC Layer 4]

The coating solution for a HC layer 4 was prepared using the same preparation method as that of the coating solution for a HC layer 1, except that 50 parts by mass of KAYARAD PET 30 and 50 parts by mass of DCP were changed to 100 parts by mass of UV1700B (a monomer having 10 polymerizable groups, manufactured by Nippon Synthetic Chemical Industry Co., Ltd.).

The coating solution for a HC layer 4 was applied to a surface of the support (PET film) where the easy adhesion layer was not provided using a #3.6 wire bar coater. Next, the laminate was applied was dried at 45° C. for 60 seconds and was irradiated with ultraviolet light at 500 mJ/cm$^2$ at 25° C. using an ultraviolet irradiation device. As a result, a support 4 with the HC layer 4 having a thickness of 1.4 μm was prepared.

A reflection film was prepared using the same method as that of Example 1, except that the support 4 was used.

Example 8

A support including the HC layer was prepared using the same method as that of Example 6, except that a #13 wire bar coater was used to apply the coating solution for a HC layer 3. The thickness of the HC layer was 5 μm.

A reflection film was prepared using the same method as that of Example 6, except that the support was used.

Comparative Example 2

A reflection film was prepared using the same method as that of Example 1, except that the first reflective layer was formed directly on the PET film without forming the HC layer on the support.

<Verification of Flapping Structure and PG Structure>

A cross-section of the prepared reflective sheet was observed with a SEM, and whether or not the first reflective layer and the second reflective layer had the flapping structure and the PG structure was verified from the SEM image. In order to suppress deterioration of a sample during the observation with the SEM, platinum was sputtered in advance to form a platinum film on the cross-section. Sputtering was performed using an ion sputter E-1030 (manufactured by Hitachi High-Tech America, Inc.).

As a result, in all the reflection films, it was verified that the first reflective layer and the second reflective layer has the flapping structure and the PG structure.

In this case, in the reflective sheets according to Examples 1 to 8 and Comparative Example 2, the helical pitch of the PG structure of the first reflective layer and the second reflective layer gradually increased from the HC layer to the adhesive layer. On the other hand, in the reflective sheet according to Comparative Example 1, conversely, the helical pitch of the PG structure of the first reflective layer and the second reflective layer gradually decreased from the HC layer to the adhesive layer.

In all the prepared reflective sheet, the total thickness of the first reflective layer and the second reflective layer was 9 μm.

<Evaluation of Reflective Sheet>

For the prepared reflective sheets, the light diffusibility, the integral reflectivity, the pencil hardness, and the resistance to steel wool were evaluated.

[Measurement of Integral Reflectivity]

Using a device in which a large integrating sphere device (ILV-471, manufactured by JASCO Corporation) was attached to a spectrophotometer (V-550, manufactured by JASCO Corporation), an integral reflection spectrum of the reflective sheet was measured to include specularly reflected light without using optical trap (SCI). The reflective sheet was set such that light was incident from the HC layer side. The reflective sheet according to Comparative Example 2 not including the HC layer was set such that light was incident from the second reflective layer side.

In the obtained integral reflection spectrum, a reflectivity at a wavelength of 450 nm was measured and was evaluated based on the following standards.

A: the reflectivity was 75% or higher
B: the reflectivity was lower than 75%

[Measurement of Light Diffusibility]

As in the integral reflectivity, using a device in which a large integrating sphere device (ILV-471, manufactured by JASCO Corporation) was attached to a spectrophotometer (V-550, manufactured by JASCO Corporation), an integral reflection spectrum of the reflective sheet was measured to include specularly reflected light using optical trap in a specular reflection direction (SCE).

The reflective sheet was set such that light was incident from the HC layer side. The reflective sheet according to Comparative Example 2 not including the HC layer was set such that light was incident from the second reflective layer side.

By using the previously measured SCI, the light diffusibility was obtained from the following expression.

Light Diffusibility [%]=(SCE/SCI)×100

It can be said that a light diffusibility of 50% or higher is excellent.

[Measurement of Pencil Hardness]

The pencil hardness was evaluated according to JIS (Japanese Industrial Standards) K 5400.

The humidity of the prepared reflective sheet was controlled at a temperature of 25° C. and a relative humidity of 60% for 2 hours. A surface of the humidity-controlled reflective sheet opposite to the substrate was scratched at 5 positions under a load of 4.9 N using a test pencil defined by JIS S 6006. Next, among the hardness values of the pencils at 0 to 2 positions where scratches were observed by visual inspection, the highest pencil hardness was obtained as the evaluation result.

[Measurement of Resistance to Steel Wool]

By using a rubbing tester in an environment of a temperature of 25° C. and a relative humidity of 60%, the reflective sheet was banded and prevented from moving by winding a rubbing tip part (1×1 cm) of the tester in contact with the reflective sheet with steel wool (No. 0, manufactured by NIHON STEEL WOOL Co., Ltd.). Using this tester, the surface of the prepared reflective sheet opposite to the substrate was rubbed under the following conditions.

Moving distance (one way): 13 cm, Rubbing rate: 13 cm/sec, Load: 500 g, Tip part contact area: 1 cm×1 cm.

After the test, the reflective sheet was observed with reflected light by visual inspection, and in a case where the portion in contact with the steel wool was damaged, the number of times of rubbing was measured and was evaluated based on the following standards.

A: even after the portion was rubbed 1000 times, the portion was not damaged

B: even after the portion was rubbed 100 times, the portion was not damaged; however, while the portion was rubbed more than 100 times and 1000 times or less, the portion was damaged C: even after the portion was rubbed 10 times, the portion was not damaged; however, while the portion was rubbed more than 10 times and 100 times or less, the portion was damaged D: while the portion was rubbed 10 times, the portion was damaged and there was a problem in practice The results are shown in the following table.

In addition to the above-described evaluations, for all the reflective sheets, a reflectivity with respect to light having a wavelength of 500 nm and a transmittance with respect to light having a wavelength of 450 nm at an incidence angle of 45° were measured. As a result, in all the reflective sheets, the reflectivity with respect to light having a wavelength of 500 nm was 62%, and the transmittance with respect to light having a wavelength of 450 nm at an incidence angle of 45° was 38%.

TABLE 1

| | Adhesive Layer | | Hard Coat Layer | | Evaluation | | | |
|---|---|---|---|---|---|---|---|---|
| | | | | | | Light | | Resistance |
| | Material | Thickness [μm] | Forming Material | Thickness [μm] | Integral Reflectivity | Diffusibility [%] | Pencil Hardness | to Steel Wool |
| Example 1 | Pressure Sensitive Adhesive | 25 | PET30 + DCP | 1.4 | A | 80% | B | C |
| Comparative Example 1 | Pressure Sensitive Adhesive | 25 | PET30 + DCP | 1.4 | B | 70% | B | C |
| Example 2 | Pressure Sensitive Adhesive | 10 | PET30 + DCP | 1.4 | A | 80% | HB | C |
| Example 3 | Pressure Sensitive Adhesive | 5 | PET30 + DCP | 1.4 | A | 80% | H | C |
| Example 4 | UV-Curable Adhesive | 3 | PET30 + DCP | 1.4 | A | 80% | 2H | C |
| Example 5 | Pressure Sensitive Adhesive | 25 | PET30 | 1.4 | A | 80% | B | B |
| Example 6 | Pressure Sensitive Adhesive | 25 | DPHA | 1.4 | A | 80% | B | B |
| Example 7 | Pressure Sensitive Adhesive | 25 | UV1700B | 1.4 | A | 80% | B | B |
| Example 8 | Pressure Sensitive Adhesive | 25 | DPHA | 5 | A | 80% | B | A |
| Comparative Example 2 | Pressure Sensitive Adhesive | 25 | — | — | A | 80% | 2B | D |

In Comparative Example 1, the helical potch of the PG structure decreased from the HC layer to the adhesive layer.
In other examples, the helical pitch of the PG structure increased from the HC layer to the adhesive layer.

In Comparative Example 1, the helical pitch of the PG structure decreased from the HC layer to the adhesive layer. In the other examples, the helical pitch of the PG structure increased from the HC layer to the adhesive layer.

As shown in Table 1, in the reflective sheets according to the embodiment of the present invention, the reflectivity is high, the pencil hardness is also high, and the scratch resistance is excellent.

In addition, as shown in Examples 2 and 3, by reducing the thickness of the adhesive layer, higher pencil hardness can be obtained, and the protection of the reflective layer (cholesteric liquid crystal layer) can be improved. As shown in Examples 4 to 7, by forming the HC layer using a polyfunctional compound, higher surface scratch resistance can be obtained. Further, as shown in Example 8, by increasing the thickness of the HC layer, higher surface scratch resistance can be obtained.

On the other hand, in Comparative Example 1 in which the helical pitch of the PG structure is opposite to that of the present invention, is long on the HC layer side, and is narrow on the adhesive layer side, light is reflected multiple times such that the reflectivity is low. In addition, in Comparative Example 2 not including the HC layer, the pencil hardness and the scratch resistance are low, and the reflective layer is easily damaged.

As can be seen from the above results, the effects of the present invention are obvious.

EXPLANATION OF REFERENCES

10: transfer film for a reflective sheet
12: support
14: HC layer (hard coat layer)
16R, 42R: first reflective layer
16L, 42L: second reflective layer
18: reflective sheet
20: adhesive layer
24: substrate
30: substrate
32, 34: cholesteric liquid crystal layer
B: bright portion
D: dark portion
p: distance

What is claimed is:

1. A reflective sheet comprising, in the following order:
a substrate;
an adhesive layer;
a cholesteric liquid crystal layer obtained by immobilizing a cholesteric liquid crystalline phase; and
a hard coat layer,
wherein in a cross-section of the cholesteric liquid crystal layer observed with a scanning electron microscope, at least a part of bright portions and dark portions derived from the cholesteric liquid crystalline phase has a flapping structure,
the cholesteric liquid crystal layer has a pitch gradient structure in which a helical pitch changes in a thickness direction, and
the helical pitch on the adhesive layer side is larger than that on the hard coat layer side.

2. The reflective sheet according to claim 1,
wherein as the cholesteric liquid crystal layer, a first cholesteric liquid crystal layer and a second cholesteric liquid crystal layer where a selective reflection center wavelength is the same as that of the first cholesteric liquid crystal layer and a turning direction of circularly polarized light to be selectively reflected is opposite to that of the first cholesteric liquid crystal layer are provided.

3. The reflective sheet according to claim 1, wherein in a case where light is emitted from the hard coat layer side, an integral reflectivity with respect to light having a wavelength of 450 nm is 50% to 90% and an integral reflectivity with respect to light having a wavelength of 500 nm is 30% to 80%.

4. The reflective sheet according to claim 1, wherein a thickness of the adhesive layer is 30 μm or less.

5. The reflective sheet according to claim 1, wherein the adhesive layer is a layer obtained by curing an ultraviolet curable adhesive.

6. The reflective sheet according to claim 1, wherein the hard coat layer and the cholesteric liquid crystal layer are directly laminated.

7. The reflective sheet according to claim 1, wherein the hard coat layer is a layer including a polymer obtained by polymerization of a monomer having three or more polymerizable groups.

8. The reflective sheet according to claim 1, wherein a thickness of the hard coat layer is 1 μm or more.

9. A transfer film for a reflective sheet comprising, in the following order:
a peelable support;
a hard coat layer; and
a cholesteric liquid crystal layer obtained by immobilizing a cholesteric liquid crystalline phase,
wherein in a cross-section of the cholesteric liquid crystal layer observed with a scanning electron microscope, at least a part of bright portions and dark portions derived from the cholesteric liquid crystalline phase has a flapping structure, and the cholesteric liquid crystal layer has a pitch gradient structure in which a helical pitch changes in a thickness direction, and
the helical pitch on a side opposite to the hard coat layer is larger than that on the hard coat layer side.

10. The transfer film for a reflective sheet according to claim 9,
wherein as the cholesteric liquid crystal layer, a first cholesteric liquid crystal layer and a second cholesteric liquid crystal layer where a selective reflection center wavelength is the same as that of the first cholesteric liquid crystal layer and a turning direction of circularly polarized light to be selectively reflected is opposite to that of the first cholesteric liquid crystal layer are provided.

11. The transfer film for a reflective sheet according to claim 9,
wherein the hard coat layer and the cholesteric liquid crystal layer are directly laminated.

12. The transfer film for a reflective sheet according to claim 9,
wherein the hard coat layer is a layer including a polymer obtained by polymerization of a monomer having three or more polymerizable groups.

13. The transfer film for a reflective sheet according to claim 9,
wherein a thickness of the hard coat layer is 1 μm or more.

14. The reflective sheet according to claim 2,
wherein in a case where light is emitted from the hard coat layer side, an integral reflectivity with respect to light having a wavelength of 450 nm is 50% to 90% and an integral reflectivity with respect to light having a wavelength of 500 nm is 30% to 80%.

* * * * *